US 9,116,324 B2

(12) United States Patent
Cooke et al.

(10) Patent No.: US 9,116,324 B2
(45) Date of Patent: Aug. 25, 2015

(54) STACKED FIBER OPTIC MODULES AND FIBER OPTIC EQUIPMENT CONFIGURED TO SUPPORT STACKED FIBER OPTIC MODULES

(75) Inventors: Terry L. Cooke, Hickory, NC (US);
David L. Dean, Jr., Hickory, NC (US);
Juan Garcia Martinez, Reynosa (MX);
Sebastian Schreiber, Berlin (DE)

(73) Assignee: Corning Cable Systems LLC, Hickory, NC (US)

( * ) Notice: Subject to any disclaimer, the term of this patent is extended or adjusted under 35 U.S.C. 154(b) by 1024 days.

(21) Appl. No.: 12/947,883

(22) Filed: Nov. 17, 2010

(65) Prior Publication Data

US 2012/0106911 A1    May 3, 2012

Related U.S. Application Data

(60) Provisional application No. 61/408,196, filed on Oct. 29, 2010.

(51) Int. Cl.
*G02B 6/00* (2006.01)
*G02B 6/44* (2006.01)
*G02B 6/38* (2006.01)

(52) U.S. Cl.
CPC ............ *G02B 6/4452* (2013.01); *G02B 6/3897* (2013.01)

(58) Field of Classification Search
USPC ........................................................ 385/135
See application file for complete search history.

(56) References Cited

U.S. PATENT DOCUMENTS

| 620,013 | A | 2/1899 | Barnes |
| 864,761 | A | 8/1907 | Erickson |
| 2,614,685 | A | 10/1952 | Miller |
| 3,175,873 | A | 3/1965 | Blomquist et al. |
| 3,212,192 | A | 10/1965 | Bachmann et al. |
| 3,433,886 | A | 3/1969 | Myers |
| 3,494,306 | A | 2/1970 | Aguilar |
| 3,568,263 | A | 3/1971 | Meehan |

(Continued)

FOREIGN PATENT DOCUMENTS

| AU | 2010270959 A1 | 2/2012 |
| CA | 2029592 A1 | 5/1992 |

(Continued)

OTHER PUBLICATIONS

International Search Report for PCT/US2011/030446 mailed Jul. 14, 2011, 2 pages.

(Continued)

*Primary Examiner* — Michelle R Connelly
*Assistant Examiner* — Hoang Tran

(57) ABSTRACT

Embodiments disclosed in the detailed description include stacked fiber optic modules and fiber optic equipment supporting stacked fiber optic modules. In one embodiment, a stacked fiber optic module is provided. This embodiment of the stacked fiber optic module comprises a body having a first sub-body and a second sub-body where the second sub-body can translate relative to the first sub-body. The stacked fiber optic module further comprises a first plurality of fiber optic components disposed in a first longitudinal axis in the at least one front side. The stacked fiber optic module also further comprises a second plurality of fiber optic components disposed adjacent the first plurality of fiber optic components in a second longitudinal axis parallel or substantially parallel to the first longitudinal axis in the at least one front side.

19 Claims, 24 Drawing Sheets

(56) References Cited

U.S. PATENT DOCUMENTS

| | | |
|---|---|---|
| 3,646,244 A | 2/1972 | Cole |
| 3,664,514 A | 5/1972 | Drake |
| 3,683,238 A | 8/1972 | Olds et al. |
| 3,880,396 A | 4/1975 | Freiberger et al. |
| 3,906,592 A | 9/1975 | Sakasegawa et al. |
| 4,047,797 A | 9/1977 | Arnold et al. |
| 4,059,872 A | 11/1977 | Delesandri |
| 4,119,285 A | 10/1978 | Bisping et al. |
| 4,239,316 A | 12/1980 | Spaulding |
| 4,244,638 A | 1/1981 | Little et al. |
| 4,285,486 A | 8/1981 | Von Osten et al. |
| 4,303,296 A | 12/1981 | Spaulding |
| 4,354,731 A | 10/1982 | Mouissie |
| 4,457,482 A | 7/1984 | Kitagawa |
| 4,525,012 A | 6/1985 | Dunner |
| 4,597,173 A | 7/1986 | Chino et al. |
| 4,611,875 A | 9/1986 | Clarke et al. |
| 4,645,292 A | 2/1987 | Sammueller |
| 4,657,340 A | 4/1987 | Tanaka et al. |
| 4,702,551 A | 10/1987 | Coulombe |
| 4,736,100 A | 4/1988 | Vastagh |
| 4,744,629 A | 5/1988 | Bertoglio et al. |
| 4,747,020 A | 5/1988 | Brickley et al. |
| 4,752,110 A | 6/1988 | Blanchet et al. |
| 4,753,510 A | 6/1988 | Sezerman |
| 4,787,706 A | 11/1988 | Cannon, Jr. et al. |
| 4,792,203 A | 12/1988 | Nelson et al. |
| 4,798,432 A | 1/1989 | Becker et al. |
| 4,808,774 A | 2/1989 | Crane |
| 4,824,193 A | 4/1989 | Maeda et al. |
| 4,824,196 A | 4/1989 | Bylander |
| 4,826,277 A | 5/1989 | Weber et al. |
| 4,838,643 A | 6/1989 | Hodges et al. |
| 4,840,449 A | 6/1989 | Ghandeharizadeh |
| 4,865,280 A | 9/1989 | Wollar |
| 4,898,448 A | 2/1990 | Cooper |
| 4,900,123 A | 2/1990 | Barlow |
| 4,911,662 A | 3/1990 | Debortoli et al. |
| 4,948,220 A | 8/1990 | Violo et al. |
| 4,949,376 A | 8/1990 | Nieves et al. |
| 4,971,421 A | 11/1990 | Ori |
| 4,986,625 A | 1/1991 | Yamada et al. |
| 4,988,831 A | 1/1991 | Wilson et al. |
| 4,991,928 A | 2/1991 | Zimmer |
| 4,995,688 A | 2/1991 | Anton et al. |
| 5,001,602 A | 3/1991 | Suffi et al. |
| 5,005,941 A | 4/1991 | Barlow et al. |
| 5,017,211 A | 5/1991 | Wenger et al. |
| 5,023,646 A | 6/1991 | Ishida et al. |
| 5,024,498 A | 6/1991 | Becker et al. |
| 5,028,114 A | 7/1991 | Krausse et al. |
| 5,037,175 A | 8/1991 | Weber |
| 5,048,918 A | 9/1991 | Daems et al. |
| 5,066,149 A | 11/1991 | Wheeler et al. |
| 5,067,784 A | 11/1991 | Debortoli et al. |
| 5,071,211 A * | 12/1991 | Debortoli et al. ............... 385/76 |
| 5,071,220 A | 12/1991 | Ruello et al. |
| 5,073,042 A | 12/1991 | Mulholland et al. |
| 5,074,635 A | 12/1991 | Justice et al. |
| 5,076,688 A | 12/1991 | Bowen et al. |
| 5,080,459 A | 1/1992 | Wettengel et al. |
| 5,100,221 A | 3/1992 | Carney et al. |
| 5,104,336 A | 4/1992 | Hatanaka et al. |
| 5,125,060 A | 6/1992 | Edmundson |
| 5,127,082 A | 6/1992 | Below et al. |
| 5,127,851 A | 7/1992 | Hilbert et al. |
| 5,129,030 A | 7/1992 | Petrunia |
| 5,133,039 A | 7/1992 | Dixit |
| 5,138,678 A | 8/1992 | Briggs et al. |
| 5,138,688 A | 8/1992 | Debortoli |
| 5,142,598 A | 8/1992 | Tabone |
| 5,142,607 A | 8/1992 | Petrotta et al. |
| 5,150,277 A | 9/1992 | Bainbridge et al. |
| D330,368 S | 10/1992 | Bourgeois et al. |
| 5,152,760 A | 10/1992 | Latina |
| 5,153,910 A | 10/1992 | Mickelson et al. |
| 5,157,749 A | 10/1992 | Briggs et al. |
| 5,167,001 A | 11/1992 | Debortoli et al. |
| 5,170,452 A | 12/1992 | Ott |
| 5,189,723 A | 2/1993 | Johnson et al. |
| 5,199,099 A | 3/1993 | Dalgoutte |
| 5,204,929 A | 4/1993 | Machall et al. |
| 5,209,572 A | 5/1993 | Jordan |
| 5,214,735 A | 5/1993 | Henneberger et al. |
| 5,224,186 A | 6/1993 | Kishimoto et al. |
| 5,231,687 A | 7/1993 | Handley |
| 5,231,688 A | 7/1993 | Zimmer |
| 5,233,674 A | 8/1993 | Vladic |
| 5,239,609 A | 8/1993 | Auteri |
| 5,243,679 A | 9/1993 | Sharrow et al. |
| 5,253,320 A | 10/1993 | Takahashi et al. |
| 5,260,957 A | 11/1993 | Hakimi et al. |
| 5,261,633 A | 11/1993 | Mastro |
| 5,265,187 A | 11/1993 | Morin et al. |
| 5,274,729 A | 12/1993 | King et al. |
| 5,274,731 A | 12/1993 | White |
| 5,280,138 A | 1/1994 | Preston et al. |
| 5,285,515 A | 2/1994 | Milanowski et al. |
| 5,315,679 A | 5/1994 | Baldwin et al. |
| 5,317,663 A | 5/1994 | Beard et al. |
| 5,323,478 A | 6/1994 | Milanowski et al. |
| 5,323,480 A | 6/1994 | Mullaney et al. |
| 5,333,193 A | 7/1994 | Cote et al. |
| 5,333,221 A | 7/1994 | Briggs et al. |
| 5,333,222 A | 7/1994 | Belenkiy et al. |
| 5,337,400 A | 8/1994 | Morin et al. |
| 5,339,379 A | 8/1994 | Kutsch et al. |
| 5,347,603 A | 9/1994 | Belenkiy et al. |
| 5,353,367 A | 10/1994 | Czosnowski et al. |
| 5,359,688 A | 10/1994 | Underwood |
| 5,363,466 A | 11/1994 | Milanowski et al. |
| 5,363,467 A | 11/1994 | Keith |
| 5,366,388 A | 11/1994 | Freeman et al. |
| 5,367,598 A | 11/1994 | Devenish, III et al. |
| 5,373,421 A | 12/1994 | Detsikas et al. |
| 5,383,051 A | 1/1995 | Delrosso et al. |
| 5,390,272 A | 2/1995 | Repta et al. |
| 5,398,295 A | 3/1995 | Chang et al. |
| 5,398,820 A | 3/1995 | Kiss |
| 5,399,814 A | 3/1995 | Staber et al. |
| 5,401,193 A | 3/1995 | Lo Cicero et al. |
| 5,402,515 A | 3/1995 | Vidacovich et al. |
| 5,408,557 A | 4/1995 | Hsu |
| RE34,955 E | 5/1995 | Anton et al. |
| 5,412,751 A | 5/1995 | Siemon et al. |
| 5,416,837 A | 5/1995 | Cote et al. |
| 5,418,874 A | 5/1995 | Carlisle et al. |
| 5,421,532 A | 6/1995 | Richter |
| 5,444,804 A | 8/1995 | Yui et al. |
| 5,495,549 A | 2/1996 | Schneider et al. |
| 5,511,798 A | 4/1996 | Kawamoto et al. |
| 5,530,786 A | 6/1996 | Radliff et al. |
| 5,546,495 A | 8/1996 | Bruckner et al. |
| 5,563,971 A | 10/1996 | Abendschein |
| 5,596,670 A | 1/1997 | Debortoli et al. |
| 5,608,606 A | 3/1997 | Blaney |
| 5,668,910 A | 9/1997 | Arnett |
| 5,668,911 A | 9/1997 | Debortoli |
| 5,689,607 A | 11/1997 | Vincent et al. |
| 5,692,079 A | 11/1997 | Iso |
| 5,717,810 A * | 2/1998 | Wheeler ....................... 385/135 |
| 5,765,698 A | 6/1998 | Bullivant |
| 5,788,087 A | 8/1998 | Orlando |
| 5,790,741 A | 8/1998 | Vincent et al. |
| 5,806,687 A | 9/1998 | Ballesteros et al. |
| 5,828,807 A | 10/1998 | Tucker et al. |
| 5,874,733 A | 2/1999 | Silver et al. |
| 5,880,864 A | 3/1999 | Williams et al. |
| 5,909,298 A | 6/1999 | Shimada et al. |
| 5,913,006 A | 6/1999 | Summach |
| 5,933,557 A | 8/1999 | Ott |
| 5,943,460 A | 8/1999 | Mead et al. |
| 5,949,946 A | 9/1999 | Debortoli et al. |
| 5,953,962 A | 9/1999 | Hewson |

(56) References Cited

U.S. PATENT DOCUMENTS

| | | | |
|---|---|---|---|
| 5,956,439 | A | 9/1999 | Pimpinella |
| 5,956,449 | A | 9/1999 | Otani et al. |
| 5,975,769 | A | 11/1999 | Larson et al. ............. 385/53 |
| 5,987,203 | A | 11/1999 | Abel et al. |
| 5,995,700 | A | 11/1999 | Burek et al. |
| 6,027,352 | A | 2/2000 | Byrne |
| 6,049,963 | A | 4/2000 | Boe |
| 6,061,492 | A | 5/2000 | Strause et al. |
| 6,078,661 | A | 6/2000 | Arnett et al. |
| 6,079,881 | A | 6/2000 | Roth |
| 6,118,075 | A | 9/2000 | Baker et al. |
| 6,127,627 | A | 10/2000 | Daoud |
| 6,130,983 | A | 10/2000 | Cheng |
| 6,134,370 | A | 10/2000 | Childers et al. |
| 6,141,222 | A | 10/2000 | Toor et al. |
| 6,149,313 | A | 11/2000 | Giebel et al. |
| 6,149,315 | A | 11/2000 | Stephenson |
| 6,151,432 | A | 11/2000 | Nakajima et al. |
| 6,160,946 | A | 12/2000 | Thompson et al. |
| 6,181,861 | B1 | 1/2001 | Wenski et al. |
| 6,188,687 | B1 | 2/2001 | Mussman et al. |
| 6,188,825 | B1 | 2/2001 | Bandy et al. |
| 6,192,180 | B1 | 2/2001 | Kim et al. |
| 6,200,170 | B1 | 3/2001 | Amberg et al. |
| 6,201,919 | B1 | 3/2001 | Puetz et al. |
| 6,201,920 | B1 | 3/2001 | Noble et al. |
| 6,208,796 | B1 | 3/2001 | Williams |
| 6,212,324 | B1 | 4/2001 | Lin et al. |
| 6,215,938 | B1 | 4/2001 | Reitmeier et al. |
| 6,227,717 | B1 | 5/2001 | Ott et al. |
| 6,234,683 | B1 | 5/2001 | Waldron et al. |
| 6,234,685 | B1 | 5/2001 | Carlisle et al. |
| 6,236,795 | B1 | 5/2001 | Rodgers |
| 6,240,229 | B1 | 5/2001 | Roth |
| 6,243,522 | B1 | 6/2001 | Allan et al. |
| 6,245,998 | B1 | 6/2001 | Curry et al. |
| 6,247,851 | B1 | 6/2001 | Ichihara |
| 6,250,816 | B1 | 6/2001 | Johnston et al. |
| 6,263,141 | B1 | 7/2001 | Smith |
| 6,265,680 | B1 | 7/2001 | Robertson |
| 6,269,212 | B1 | 7/2001 | Schiattone |
| 6,275,641 | B1 | 8/2001 | Daoud |
| 6,278,829 | B1 | 8/2001 | BuAbbud et al. |
| 6,278,831 | B1 | 8/2001 | Henderson et al. |
| D448,005 | S | 9/2001 | Klein, Jr. et al. |
| 6,292,614 | B1 | 9/2001 | Smith et al. |
| 6,301,424 | B1 | 10/2001 | Hwang |
| 6,307,997 | B1 | 10/2001 | Walters et al. |
| 6,318,824 | B1 | 11/2001 | LaGrotta et al. |
| 6,321,017 | B1 | 11/2001 | Janus et al. |
| 6,322,279 | B1 | 11/2001 | Yamamoto et al. |
| 6,325,549 | B1 | 12/2001 | Shevchuk |
| RE37,489 | E | 1/2002 | Anton et al. |
| 6,343,313 | B1 | 1/2002 | Salesky et al. |
| 6,344,615 | B1 | 2/2002 | Nolf et al. |
| 6,347,888 | B1 | 2/2002 | Puetz |
| 6,353,696 | B1 | 3/2002 | Gordon et al. |
| 6,353,697 | B1 | 3/2002 | Daoud |
| 6,357,712 | B1 | 3/2002 | Lu |
| 6,359,228 | B1 | 3/2002 | Strause et al. |
| 6,363,198 | B1 | 3/2002 | Braga et al. |
| 6,363,200 | B1 | 3/2002 | Thompson et al. |
| 6,370,309 | B1 | 4/2002 | Daoud |
| 6,377,218 | B1 | 4/2002 | Nelson et al. |
| 6,379,052 | B1 | 4/2002 | De Jong et al. |
| 6,385,374 | B2 | 5/2002 | Kropp |
| 6,385,381 | B1 | 5/2002 | Janus et al. |
| 6,389,214 | B1 | 5/2002 | Smith et al. |
| 6,392,140 | B1 | 5/2002 | Yee et al. |
| 6,397,166 | B1 | 5/2002 | Leung et al. |
| 6,398,149 | B1 | 6/2002 | Hines et al. |
| 6,406,314 | B1 | 6/2002 | Byrne |
| 6,410,850 | B1 | 6/2002 | Abel et al. |
| 6,411,767 | B1 | 6/2002 | Burrous et al. |
| 6,412,986 | B1 | 7/2002 | Ngo et al. |
| 6,418,262 | B1 | 7/2002 | Puetz et al. |
| 6,419,519 | B1 | 7/2002 | Young |
| 6,424,781 | B1 | 7/2002 | Puetz et al. |
| 6,425,694 | B1 | 7/2002 | Szilagyi et al. |
| 6,427,045 | B1 | 7/2002 | Matthes et al. |
| 6,431,762 | B1 | 8/2002 | Taira et al. |
| 6,434,313 | B1 | 8/2002 | Clapp, Jr. et al. |
| 6,438,310 | B1 | 8/2002 | Lance et al. |
| 6,452,925 | B1 | 9/2002 | Sistanizadeh et al. |
| 6,456,773 | B1 | 9/2002 | Keys |
| 6,464,402 | B1 | 10/2002 | Andrews et al. |
| 6,466,724 | B1 | 10/2002 | Glover et al. |
| 6,469,905 | B1 | 10/2002 | Hwang |
| D466,087 | S | 11/2002 | Cuny et al. |
| 6,478,472 | B1 | 11/2002 | Anderson et al. |
| 6,480,487 | B1 | 11/2002 | Wegleitner et al. |
| 6,480,660 | B1 | 11/2002 | Reitmeier et al. |
| 6,483,977 | B2 | 11/2002 | Battey et al. |
| 6,484,958 | B1 | 11/2002 | Xue et al. |
| 6,496,640 | B1 | 12/2002 | Harvey et al. |
| 6,504,988 | B1 | 1/2003 | Trebesch et al. |
| 6,507,980 | B2 | 1/2003 | Bremicker |
| 6,510,274 | B1 | 1/2003 | Wu et al. |
| 6,532,332 | B2 | 3/2003 | Solheid et al. |
| 6,533,472 | B1 | 3/2003 | Dinh et al. |
| 6,535,397 | B2 | 3/2003 | Clark et al. |
| 6,539,147 | B1 | 3/2003 | Mahony |
| 6,539,160 | B2 | 3/2003 | Battey et al. |
| 6,542,688 | B1 | 4/2003 | Battey et al. |
| 6,544,075 | B1 | 4/2003 | Liao |
| 6,550,977 | B2 | 4/2003 | Hizuka |
| 6,554,485 | B1 | 4/2003 | Beatty et al. |
| 6,560,334 | B1 | 5/2003 | Mullaney et al. |
| 6,567,601 | B2 | 5/2003 | Daoud et al. |
| 6,568,542 | B1 | 5/2003 | Chen |
| 6,571,048 | B1 | 5/2003 | Bechamps et al. |
| 6,577,595 | B1 | 6/2003 | Counterman |
| 6,577,801 | B2 | 6/2003 | Broderick et al. |
| 6,579,014 | B2 | 6/2003 | Melton et al. |
| 6,584,267 | B1 | 6/2003 | Caveney et al. |
| 6,587,630 | B2 | 7/2003 | Spence et al. |
| 6,588,938 | B1 | 7/2003 | Lampert et al. |
| 6,591,051 | B2 | 7/2003 | Solheid et al. |
| 6,592,266 | B1 | 7/2003 | Hankins et al. |
| 6,597,670 | B1 | 7/2003 | Tweedy et al. |
| 6,600,106 | B2 | 7/2003 | Standish et al. |
| 6,600,866 | B2 | 7/2003 | Gatica et al. |
| 6,601,997 | B2 | 8/2003 | Ngo |
| 6,612,515 | B1 | 9/2003 | Tinucci et al. |
| 6,612,874 | B1 | 9/2003 | Stout et al. |
| 6,614,978 | B1 | 9/2003 | Caveney |
| 6,614,980 | B1 | 9/2003 | Mahony |
| 6,621,975 | B2 | 9/2003 | Laporte et al. |
| 6,624,389 | B1 | 9/2003 | Cox |
| 6,625,374 | B2 | 9/2003 | Holman et al. |
| 6,625,375 | B1 | 9/2003 | Mahony |
| 6,631,237 | B2 | 10/2003 | Knudsen et al. |
| 6,640,042 | B2 | 10/2003 | Araki et al. |
| RE38,311 | E | 11/2003 | Wheeler |
| 6,644,863 | B1 | 11/2003 | Azami et al. |
| 6,647,197 | B1 | 11/2003 | Marrs et al. |
| 6,648,520 | B2 | 11/2003 | McDonald et al. |
| 6,654,536 | B2 | 11/2003 | Battey et al. |
| 6,668,127 | B1 | 12/2003 | Mahony |
| 6,677,520 | B1 | 1/2004 | Kim et al. |
| 6,679,604 | B1 | 1/2004 | Bove et al. |
| 6,687,450 | B1 | 2/2004 | Kempeneers et al. |
| 6,693,552 | B1 | 2/2004 | Herzig et al. |
| 6,695,620 | B1 | 2/2004 | Huang |
| 6,701,056 | B2 | 3/2004 | Burek et al. |
| 6,710,366 | B1 | 3/2004 | Lee et al. |
| 6,715,619 | B2 | 4/2004 | Kim et al. |
| 6,719,149 | B2 | 4/2004 | Tomino |
| 6,721,482 | B1 | 4/2004 | Glynn |
| 6,728,462 | B2 | 4/2004 | Wu et al. |
| 6,741,784 | B1 | 5/2004 | Guan |
| 6,741,785 | B2 | 5/2004 | Barthel et al. |
| 6,746,037 | B1 | 6/2004 | Kaplenski et al. |
| 6,748,154 | B2 | 6/2004 | O'Leary et al. |

(56) References Cited

U.S. PATENT DOCUMENTS

| | | |
|---|---|---|
| 6,748,155 B2 | 6/2004 | Kim et al. |
| 6,758,600 B2 | 7/2004 | Del Grosso et al. |
| 6,768,860 B2 | 7/2004 | Liberty |
| 6,771,861 B2 | 8/2004 | Wagner et al. |
| 6,773,297 B2 | 8/2004 | Komiya |
| 6,778,525 B1 | 8/2004 | Baum et al. |
| 6,778,752 B2 | 8/2004 | Laporte et al. |
| 6,786,647 B1 | 9/2004 | Hinds et al. |
| 6,786,743 B2 | 9/2004 | Huang |
| 6,786,896 B1 | 9/2004 | Madhani et al. |
| 6,788,871 B2 | 9/2004 | Taylor |
| 6,792,190 B2 | 9/2004 | Xin et al. |
| 6,792,191 B1 | 9/2004 | Clapp, Jr. et al. |
| 6,798,751 B1 | 9/2004 | Voit et al. |
| 6,804,447 B2 | 10/2004 | Smith et al. |
| 6,810,194 B2 | 10/2004 | Griffiths et al. |
| 6,813,412 B2 | 11/2004 | Lin |
| 6,816,660 B2 | 11/2004 | Nashimoto |
| 6,819,856 B2 | 11/2004 | Dagley et al. |
| 6,819,857 B2 | 11/2004 | Douglas et al. |
| 6,826,174 B1 | 11/2004 | Erekson et al. |
| 6,826,346 B2 | 11/2004 | Sloan et al. |
| 6,830,489 B2 | 12/2004 | Aoyama |
| 6,839,428 B2 | 1/2005 | Brower et al. |
| 6,839,438 B1 | 1/2005 | Riegelsberger et al. |
| 6,840,815 B2 | 1/2005 | Musolf et al. |
| 6,845,207 B2 | 1/2005 | Schray |
| 6,848,862 B1 | 2/2005 | Schlig |
| 6,850,685 B2 | 2/2005 | Tinucci et al. |
| 6,853,637 B1 | 2/2005 | Norrell et al. |
| 6,854,894 B1 | 2/2005 | Yunker et al. |
| 6,856,334 B1 | 2/2005 | Fukui |
| 6,856,505 B1 | 2/2005 | Venegas et al. |
| 6,865,331 B2 | 3/2005 | Mertesdorf |
| 6,865,334 B2 | 3/2005 | Cooke et al. |
| 6,866,541 B2 | 3/2005 | Barker et al. |
| 6,868,216 B1 | 3/2005 | Gehrke |
| 6,869,227 B2 | 3/2005 | Del Grosso et al. |
| 6,870,734 B2 | 3/2005 | Mertesdorf et al. |
| 6,870,997 B2 | 3/2005 | Cooke et al. |
| 6,879,545 B2 | 4/2005 | Cooke et al. |
| 6,915,058 B2 | 7/2005 | Pons |
| 6,920,273 B2 | 7/2005 | Knudsen |
| 6,920,274 B2 | 7/2005 | Rapp et al. |
| 6,925,241 B2 | 8/2005 | Bohle et al. |
| 6,934,451 B2 | 8/2005 | Cooke |
| 6,934,456 B2 | 8/2005 | Ferris et al. |
| 6,937,807 B2 | 8/2005 | Franklin et al. |
| 6,944,383 B1 | 9/2005 | Herzog et al. |
| 6,944,389 B2 | 9/2005 | Giraud et al. |
| 6,952,530 B2 | 10/2005 | Helvajian et al. |
| 6,963,690 B1 | 11/2005 | Kassal et al. |
| 6,968,107 B2 | 11/2005 | Belardi et al. |
| 6,968,111 B2 | 11/2005 | Trebesch et al. |
| 6,985,665 B2 | 1/2006 | Baechtle |
| 6,993,237 B2 | 1/2006 | Cooke et al. |
| 7,000,784 B2 | 2/2006 | Canty et al. |
| 7,005,582 B2 | 2/2006 | Muller et al. |
| 7,006,748 B2 | 2/2006 | Dagley et al. |
| 7,007,296 B2 | 2/2006 | Rakib |
| 7,025,275 B2 | 4/2006 | Huang et al. |
| 7,027,695 B2 | 4/2006 | Cooke et al. |
| 7,027,706 B2 | 4/2006 | Diaz et al. |
| 7,031,588 B2 | 4/2006 | Cowley et al. |
| 7,035,510 B2 | 4/2006 | Zimmel et al. |
| 7,038,137 B2 | 5/2006 | Grubish et al. |
| 7,048,447 B1 | 5/2006 | Patel et al. |
| 7,054,513 B2 | 5/2006 | Herz et al. |
| 7,066,748 B2 | 6/2006 | Bricaud et al. |
| 7,068,907 B2 | 6/2006 | Schray |
| 7,070,459 B2 | 7/2006 | Denovich et al. |
| 7,077,710 B2 | 7/2006 | Haggay et al. |
| 7,079,744 B2 | 7/2006 | Douglas et al. |
| 7,090,406 B2 | 8/2006 | Melton et al. |
| 7,090,407 B2 | 8/2006 | Melton et al. |
| 7,094,095 B1 | 8/2006 | Caveney |
| 7,097,047 B2 | 8/2006 | Lee et al. |
| 7,101,093 B2 | 9/2006 | Hsiao et al. |
| 7,102,884 B2 | 9/2006 | Mertesdorf et al. |
| 7,103,255 B2 | 9/2006 | Reagan et al. |
| 7,110,654 B2 | 9/2006 | Dillat |
| 7,111,990 B2 | 9/2006 | Melton et al. |
| 7,113,679 B2 | 9/2006 | Melton et al. |
| 7,113,686 B2 | 9/2006 | Bellekens et al. |
| 7,113,687 B2 | 9/2006 | Womack et al. |
| 7,116,491 B1 | 10/2006 | Willey et al. |
| 7,116,883 B2 | 10/2006 | Kline et al. |
| 7,118,281 B2 | 10/2006 | Chiu et al. |
| 7,118,405 B2 | 10/2006 | Peng |
| 7,120,347 B2 | 10/2006 | Blackwell, Jr. et al. |
| 7,120,348 B2 | 10/2006 | Trebesch et al. |
| 7,120,349 B2 | 10/2006 | Elliott |
| 7,127,143 B2 | 10/2006 | Elkins, II et al. |
| 7,128,471 B2 | 10/2006 | Wilson |
| 7,136,555 B2 | 11/2006 | Theuerkorn et al. |
| 7,139,462 B1 | 11/2006 | Richtman |
| 7,170,466 B2 | 1/2007 | Janoschka |
| 7,171,099 B2 | 1/2007 | Barnes et al. |
| 7,171,121 B1 | 1/2007 | Skarica et al. |
| 7,181,142 B1 | 2/2007 | Xu et al. |
| 7,186,134 B2 | 3/2007 | Togami et al. |
| 7,193,783 B2 | 3/2007 | Willey et al. |
| 7,194,181 B2 | 3/2007 | Holmberg et al. |
| 7,195,521 B2 | 3/2007 | Musolf et al. |
| 7,200,314 B2 | 4/2007 | Womack et al. |
| 7,200,316 B2 | 4/2007 | Giraud et al. |
| 7,201,595 B1 | 4/2007 | Morello |
| 7,220,065 B2 | 5/2007 | Han et al. |
| 7,228,036 B2 | 6/2007 | Elkins, II et al. |
| 7,228,047 B1 | 6/2007 | Szilagyi et al. |
| 7,231,125 B2 | 6/2007 | Douglas et al. |
| 7,234,878 B2 | 6/2007 | Yamauchi et al. |
| 7,236,677 B2 | 6/2007 | Escoto et al. |
| 7,239,789 B2 | 7/2007 | Grubish et al. |
| 7,245,809 B1 | 7/2007 | Gniadek et al. |
| 7,259,325 B2 | 8/2007 | Pincu et al. |
| 7,266,283 B2 | 9/2007 | Kline et al. |
| 7,270,485 B1 | 9/2007 | Robinson et al. |
| 7,272,291 B2 | 9/2007 | Bayazit et al. |
| 7,274,852 B1 | 9/2007 | Smrha et al. |
| 7,284,785 B2 | 10/2007 | Gotou et al. |
| 7,287,913 B2 | 10/2007 | Keenum et al. |
| 7,289,731 B2 | 10/2007 | Thinguldstad |
| 7,292,769 B2 | 11/2007 | Watanabe et al. |
| 7,298,950 B2 | 11/2007 | Frohlich |
| 7,300,216 B2 | 11/2007 | Morse et al. |
| 7,300,308 B2 | 11/2007 | Laursen et al. |
| 7,302,149 B2 | 11/2007 | Swam et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,310,471 B2 | 12/2007 | Bayazit et al. |
| 7,310,472 B2 | 12/2007 | Haberman |
| 7,315,681 B2 | 1/2008 | Kewitsch |
| 7,325,975 B2 | 2/2008 | Yamada et al. |
| 7,330,624 B2 | 2/2008 | Isenhour et al. |
| 7,330,625 B2 | 2/2008 | Barth |
| 7,330,626 B2 | 2/2008 | Kowalczyk et al. |
| 7,330,629 B2 | 2/2008 | Cooke et al. |
| 7,331,718 B2 | 2/2008 | Yazaki et al. |
| 7,340,145 B2 | 3/2008 | Allen |
| 7,349,615 B2 | 3/2008 | Frazier et al. |
| 7,352,947 B2 | 4/2008 | Phung et al. |
| 7,373,071 B2 | 5/2008 | Douglas et al. |
| 7,376,321 B2 | 5/2008 | Bolster et al. |
| 7,376,323 B2 | 5/2008 | Zimmel |
| 7,391,952 B1 | 6/2008 | Ugolini et al. |
| 7,397,996 B2 | 7/2008 | Herzog et al. |
| 7,400,813 B2 | 7/2008 | Zimmel |
| 7,409,137 B2 | 8/2008 | Barnes |
| 7,414,198 B2 | 8/2008 | Stansbie et al. |
| 7,417,188 B2 | 8/2008 | McNutt et al. |
| 7,418,182 B2 | 8/2008 | Krampotich |
| 7,418,184 B1 | 8/2008 | Gonzales et al. |

(56) References Cited

U.S. PATENT DOCUMENTS

| | | |
|---|---|---|
| 7,421,182 B2 | 9/2008 | Bayazit et al. |
| 7,428,363 B2 | 9/2008 | Leon et al. |
| 7,435,090 B1 | 10/2008 | Schriefer et al. |
| 7,437,049 B2 | 10/2008 | Krampotich |
| 7,439,453 B2 | 10/2008 | Murano et al. |
| 7,454,113 B2 | 11/2008 | Barnes |
| 7,460,757 B2 | 12/2008 | Hoehne et al. |
| 7,460,758 B2 | 12/2008 | Xin |
| 7,461,981 B2 | 12/2008 | Yow, Jr. et al. |
| 7,462,779 B2 | 12/2008 | Caveney et al. |
| 7,463,810 B2 | 12/2008 | Bayazit et al. |
| 7,463,811 B2 | 12/2008 | Trebesch et al. |
| 7,469,090 B2 | 12/2008 | Ferris et al. |
| 7,471,867 B2 | 12/2008 | Vogel et al. |
| 7,474,828 B2 | 1/2009 | Leon et al. |
| 7,477,824 B2 | 1/2009 | Reagan et al. |
| 7,477,826 B2 | 1/2009 | Mullaney et al. |
| 7,480,438 B2 | 1/2009 | Douglas et al. |
| 7,488,205 B2 | 2/2009 | Spisany et al. |
| 7,493,002 B2 | 2/2009 | Coburn et al. |
| 7,496,269 B1 | 2/2009 | Lee |
| 7,499,622 B2 | 3/2009 | Castonguay et al. |
| 7,499,623 B2 | 3/2009 | Barnes et al. |
| 7,507,111 B2 | 3/2009 | Togami et al. |
| 7,509,015 B2 | 3/2009 | Murano |
| 7,509,016 B2 | 3/2009 | Smith et al. |
| 7,510,421 B2 | 3/2009 | Fransen et al. |
| 7,522,804 B2 | 4/2009 | Araki et al. |
| 7,526,171 B2 | 4/2009 | Caveney et al. |
| 7,526,172 B2 | 4/2009 | Gniadek et al. |
| 7,526,174 B2 | 4/2009 | Leon et al. |
| 7,529,458 B2 | 5/2009 | Spisany et al. |
| 7,534,958 B2 | 5/2009 | McNutt et al. |
| 7,536,075 B2 | 5/2009 | Zimmel |
| 7,540,666 B2 | 6/2009 | Luther et al. |
| 7,542,645 B1 | 6/2009 | Hua et al. |
| 7,544,085 B2 | 6/2009 | Baldwin et al. |
| 7,555,193 B2 | 6/2009 | Rapp et al. |
| 7,558,458 B2 | 7/2009 | Gronvall et al. |
| 7,565,051 B2 | 7/2009 | Vongseng |
| 7,567,744 B2 | 7/2009 | Krampotich et al. |
| 7,570,860 B2 | 8/2009 | Smrha et al. |
| 7,570,861 B2 | 8/2009 | Smrha et al. |
| 7,577,331 B2 | 8/2009 | Laurisch et al. |
| 7,596,293 B2 | 9/2009 | Isenhour et al. |
| 7,603,020 B1 | 10/2009 | Wakileh et al. |
| 7,607,938 B2 | 10/2009 | Clark et al. |
| 7,609,967 B2 | 10/2009 | Hochbaum et al. |
| 7,613,377 B2 | 11/2009 | Gonzales et al. |
| 7,614,903 B1 | 11/2009 | Huang |
| 7,620,287 B2 | 11/2009 | Appenzeller et al. |
| 7,641,398 B2 | 1/2010 | O'Riorden et al. |
| 7,668,430 B2 | 2/2010 | McClellan et al. |
| 7,668,433 B2 | 2/2010 | Bayazit et al. |
| 7,672,561 B1 | 3/2010 | Keith et al. |
| 7,676,135 B2 | 3/2010 | Chen |
| 7,697,811 B2 | 4/2010 | Murano et al. |
| 7,715,125 B2 | 5/2010 | Willey |
| 7,715,683 B2 | 5/2010 | Kowalczyk et al. |
| 7,734,138 B2 | 6/2010 | Bloodworth et al. |
| 7,740,409 B2 | 6/2010 | Bolton et al. |
| 7,743,495 B2 | 6/2010 | Mori et al. |
| 7,748,911 B2 | 7/2010 | Keenum et al. |
| 7,751,674 B2 | 7/2010 | Hill |
| 7,751,675 B2 | 7/2010 | Holmberg et al. |
| 7,756,382 B2 | 7/2010 | Saravanos et al. |
| 7,760,984 B2 | 7/2010 | Solheid et al. |
| 7,764,858 B2 | 7/2010 | Bayazit et al. |
| 7,764,859 B2 | 7/2010 | Krampotich et al. |
| 7,769,266 B2 | 8/2010 | Morris |
| 7,805,044 B2 | 9/2010 | Reagan et al. |
| 7,809,232 B2 | 10/2010 | Reagan et al. |
| 7,809,235 B2 | 10/2010 | Reagan et al. |
| 7,811,136 B1 | 10/2010 | Hsieh et al. |
| 7,822,310 B2 | 10/2010 | Castonguay et al. |
| 7,837,495 B2 | 11/2010 | Baldwin et al. |
| 7,850,372 B2 | 12/2010 | Nishimura et al. |
| 7,853,112 B2 | 12/2010 | Zimmel et al. |
| 7,856,166 B2 | 12/2010 | Biribuze et al. |
| 7,862,369 B2 | 1/2011 | Gimenes et al. |
| 7,869,685 B2 | 1/2011 | Hendrickson et al. |
| 7,876,580 B2 | 1/2011 | Mayer |
| 7,914,332 B2 | 3/2011 | Song et al. |
| 7,942,589 B2 | 5/2011 | Yazaki et al. |
| 7,945,135 B2 | 5/2011 | Cooke et al. |
| 7,945,136 B2 | 5/2011 | Cooke et al. |
| 7,945,138 B2 | 5/2011 | Hill et al. |
| 7,970,250 B2 | 6/2011 | Morris |
| 8,014,171 B2 | 9/2011 | Kelly et al. |
| 8,014,646 B2 | 9/2011 | Keith et al. |
| 8,020,813 B1 | 9/2011 | Clark et al. |
| 8,059,932 B2 | 11/2011 | Hill et al. |
| 8,093,499 B2 | 1/2012 | Hoffer et al. |
| 8,107,785 B2 | 1/2012 | Berglund et al. |
| 8,184,938 B2 | 5/2012 | Cooke et al. |
| 8,206,043 B2 | 6/2012 | Thirugnanam et al. |
| 8,206,058 B2 | 6/2012 | Vrondran et al. |
| 8,226,305 B2 | 7/2012 | Thirugnanam et al. |
| 8,249,410 B2 | 8/2012 | Andrus et al. |
| 8,270,798 B2 | 9/2012 | Dagley et al. |
| 8,280,216 B2 | 10/2012 | Cooke et al. |
| 8,331,752 B2 | 12/2012 | Biribuze et al. |
| 8,391,666 B2 | 3/2013 | Hetzer et al. |
| 8,472,773 B2 | 6/2013 | De Jong |
| 8,491,331 B2 | 7/2013 | Follingstad |
| 8,537,477 B2 | 9/2013 | Shioda |
| 8,538,226 B2 | 9/2013 | Makrides-Saravanos et al. |
| 8,559,783 B2 | 10/2013 | Campos et al. |
| 8,824,850 B2 | 9/2014 | Garcia et al. |
| 2001/0010741 A1 | 8/2001 | Hizuka |
| 2001/0029125 A1 | 10/2001 | Morita et al. |
| 2002/0010818 A1 | 1/2002 | Wei et al. |
| 2002/0012353 A1 | 1/2002 | Gerszberg et al. |
| 2002/0014571 A1 | 2/2002 | Thompson |
| 2002/0034290 A1 | 3/2002 | Pershan |
| 2002/0037139 A1 | 3/2002 | Asao et al. |
| 2002/0064364 A1 | 5/2002 | Battey et al. |
| 2002/0131730 A1 | 9/2002 | Keeble et al. |
| 2002/0136519 A1 | 9/2002 | Tinucci et al. |
| 2002/0141724 A1 | 10/2002 | Ogawa et al. |
| 2002/0150372 A1 | 10/2002 | Schray |
| 2002/0172467 A1 | 11/2002 | Anderson et al. |
| 2002/0180163 A1 | 12/2002 | Muller et al. |
| 2002/0181918 A1 | 12/2002 | Spence et al. |
| 2002/0181922 A1 | 12/2002 | Xin et al. |
| 2002/0191939 A1 | 12/2002 | Daoud et al. |
| 2002/0194596 A1 | 12/2002 | Srivastava |
| 2003/0007743 A1 | 1/2003 | Asada |
| 2003/0007767 A1 | 1/2003 | Douglas et al. |
| 2003/0021539 A1 | 1/2003 | Kwon et al. |
| 2003/0036748 A1 | 2/2003 | Cooper et al. |
| 2003/0066998 A1 | 4/2003 | Lee |
| 2003/0086675 A1 | 5/2003 | Wu et al. |
| 2003/0095753 A1 | 5/2003 | Wada et al. |
| 2003/0123834 A1 | 7/2003 | Burek et al. |
| 2003/0147604 A1 | 8/2003 | Tapia et al. |
| 2003/0174996 A1 | 9/2003 | Henschel et al. |
| 2003/0180012 A1 | 9/2003 | Deane et al. |
| 2003/0183413 A1 | 10/2003 | Kato |
| 2003/0199201 A1 | 10/2003 | Mullaney et al. |
| 2003/0210882 A1 | 11/2003 | Barthel et al. |
| 2003/0223723 A1 | 12/2003 | Massey et al. |
| 2003/0235387 A1 | 12/2003 | Dufour |
| 2004/0013389 A1 | 1/2004 | Taylor |
| 2004/0013390 A1 | 1/2004 | Kim et al. |
| 2004/0067036 A1 | 4/2004 | Clark et al. |
| 2004/0074852 A1 | 4/2004 | Knudsen et al. |
| 2004/0086238 A1 | 5/2004 | Finona et al. |
| 2004/0086252 A1 | 5/2004 | Smith et al. |
| 2004/0120679 A1 | 6/2004 | Vincent et al. |
| 2004/0147159 A1 | 7/2004 | Urban et al. |
| 2004/0151465 A1 | 8/2004 | Krampotich et al. |
| 2004/0175090 A1 | 9/2004 | Vastmans et al. |
| 2004/0192115 A1 | 9/2004 | Bugg |

(56) References Cited

U.S. PATENT DOCUMENTS

| | | |
|---|---|---|
| 2004/0208459 A1 | 10/2004 | Mizue et al. |
| 2004/0228598 A1 | 11/2004 | Allen et al. |
| 2004/0240882 A1 | 12/2004 | Lipski et al. |
| 2004/0264873 A1 | 12/2004 | Smith et al. |
| 2005/0002633 A1 | 1/2005 | Solheid et al. |
| 2005/0008131 A1 | 1/2005 | Cook |
| 2005/0026497 A1 | 2/2005 | Holliday |
| 2005/0036749 A1 | 2/2005 | Vogel et al. |
| 2005/0067358 A1 | 3/2005 | Lee et al. |
| 2005/0074990 A1 | 4/2005 | Shearman et al. |
| 2005/0076149 A1 | 4/2005 | McKown et al. |
| 2005/0083959 A1 | 4/2005 | Binder |
| 2005/0107086 A1 | 5/2005 | Tell et al. |
| 2005/0111809 A1 | 5/2005 | Giraud et al. |
| 2005/0123261 A1 | 6/2005 | Bellekens et al. |
| 2005/0129379 A1 | 6/2005 | Reagan et al. |
| 2005/0178573 A1 | 8/2005 | James |
| 2005/0201073 A1 | 9/2005 | Pincu et al. |
| 2005/0232566 A1 | 10/2005 | Rapp et al. |
| 2005/0233647 A1 | 10/2005 | Denovich et al. |
| 2005/0254757 A1 | 11/2005 | Ferretti, III et al. |
| 2005/0281526 A1 | 12/2005 | Vongseng et al. |
| 2006/0007562 A1 | 1/2006 | Willey et al. |
| 2006/0018448 A1 | 1/2006 | Stevens et al. |
| 2006/0018622 A1 | 1/2006 | Caveney et al. |
| 2006/0034048 A1 | 2/2006 | Xu |
| 2006/0039290 A1 | 2/2006 | Roden et al. |
| 2006/0044774 A1 | 3/2006 | Vasavda et al. |
| 2006/0045458 A1 | 3/2006 | Sasaki et al. |
| 2006/0072606 A1 | 4/2006 | Posthuma |
| 2006/0077968 A1 | 4/2006 | Pitsoulakis et al. |
| 2006/0093303 A1 | 5/2006 | Reagan et al. |
| 2006/0103270 A1 | 5/2006 | Bergesch et al. |
| 2006/0127026 A1 | 6/2006 | Beck |
| 2006/0133759 A1 | 6/2006 | Mullaney et al. |
| 2006/0147172 A1 | 7/2006 | Luther et al. |
| 2006/0153517 A1 | 7/2006 | Reagan et al. |
| 2006/0160377 A1 | 7/2006 | Huang |
| 2006/0165365 A1 | 7/2006 | Feustel et al. |
| 2006/0165366 A1 | 7/2006 | Feustel et al. |
| 2006/0191700 A1 | 8/2006 | Herzog et al. |
| 2006/0193590 A1 | 8/2006 | Puetz et al. |
| 2006/0193591 A1 | 8/2006 | Rapp et al. |
| 2006/0198098 A1 | 9/2006 | Clark et al. |
| 2006/0204179 A1 | 9/2006 | Patel et al. |
| 2006/0215980 A1 | 9/2006 | Bayazit et al. |
| 2006/0225912 A1 | 10/2006 | Clark et al. |
| 2006/0269194 A1 | 11/2006 | Luther et al. |
| 2006/0269205 A1 | 11/2006 | Zimmel |
| 2006/0269206 A1 | 11/2006 | Zimmel |
| 2006/0269208 A1 | 11/2006 | Allen et al. |
| 2006/0275008 A1 | 12/2006 | Xin |
| 2006/0275009 A1 | 12/2006 | Ellison et al. |
| 2006/0285812 A1 | 12/2006 | Ferris et al. |
| 2007/0003204 A1 | 1/2007 | Makrides-Saravanos et al. |
| 2007/0025070 A1 | 2/2007 | Jiang et al. |
| 2007/0031099 A1 | 2/2007 | Herzog et al. |
| 2007/0033629 A1 | 2/2007 | McGranahan et al. |
| 2007/0047891 A1 | 3/2007 | Bayazit et al. |
| 2007/0047894 A1 | 3/2007 | Holmberg et al. |
| 2007/0104447 A1 | 5/2007 | Allen |
| 2007/0110373 A1 | 5/2007 | Dudek et al. |
| 2007/0131628 A1 | 6/2007 | Mimlitch, III et al. |
| 2007/0183732 A1 | 8/2007 | Wittmeier et al. |
| 2007/0189692 A1 | 8/2007 | Zimmel et al. |
| 2007/0196071 A1 | 8/2007 | Laursen et al. |
| 2007/0221793 A1 | 9/2007 | Kusuda et al. |
| 2007/0237484 A1 | 10/2007 | Reagan et al. |
| 2007/0274718 A1 | 11/2007 | Bridges et al. |
| 2008/0011514 A1 | 1/2008 | Zheng et al. |
| 2008/0025683 A1 | 1/2008 | Murano |
| 2008/0031585 A1 | 2/2008 | Solheid et al. |
| 2008/0063350 A1 | 3/2008 | Trebesch et al. ............ 385/135 |
| 2008/0068788 A1 | 3/2008 | Ozawa et al. |
| 2008/0069511 A1 | 3/2008 | Blackwell et al. |
| 2008/0069512 A1 | 3/2008 | Barnes et al. |
| 2008/0080826 A1 | 4/2008 | Leon et al. |
| 2008/0080827 A1 | 4/2008 | Leon et al. |
| 2008/0080828 A1 | 4/2008 | Leon et al. |
| 2008/0085094 A1 | 4/2008 | Krampotich |
| 2008/0089656 A1 | 4/2008 | Wagner et al. |
| 2008/0095502 A1 | 4/2008 | McColloch |
| 2008/0095541 A1 | 4/2008 | Dallesasse |
| 2008/0100440 A1 | 5/2008 | Downie et al. |
| 2008/0106871 A1 | 5/2008 | James |
| 2008/0112681 A1 | 5/2008 | Battey et al. |
| 2008/0118207 A1 | 5/2008 | Yamamoto et al. |
| 2008/0121423 A1 | 5/2008 | Vogel et al. |
| 2008/0124039 A1 | 5/2008 | Gniadek et al. |
| 2008/0131068 A1 | 6/2008 | Mertesdorf et al. |
| 2008/0145013 A1 | 6/2008 | Escoto et al. |
| 2008/0152294 A1 | 6/2008 | Hirano et al. |
| 2008/0166094 A1 | 7/2008 | Bookbinder et al. |
| 2008/0166131 A1 | 7/2008 | Hudgins et al. |
| 2008/0175541 A1 | 7/2008 | Lu et al. |
| 2008/0175550 A1 | 7/2008 | Coburn et al. |
| 2008/0175551 A1 | 7/2008 | Smrha et al. |
| 2008/0175552 A1 | 7/2008 | Smrha et al. |
| 2008/0193091 A1 | 8/2008 | Herbst |
| 2008/0205823 A1 | 8/2008 | Luther et al. |
| 2008/0205843 A1 | 8/2008 | Castonguay et al. |
| 2008/0205844 A1 | 8/2008 | Castonguay et al. |
| 2008/0212928 A1 | 9/2008 | Kowalczyk et al. |
| 2008/0219632 A1 | 9/2008 | Smith et al. |
| 2008/0219634 A1 | 9/2008 | Rapp et al. |
| 2008/0236858 A1 | 10/2008 | Quijano |
| 2008/0247723 A1 | 10/2008 | Herzog et al. |
| 2008/0267573 A1 | 10/2008 | Douglas et al. |
| 2008/0285934 A1 | 11/2008 | Standish et al. |
| 2008/0292261 A1 | 11/2008 | Kowalczyk et al. |
| 2008/0296060 A1 | 12/2008 | Hawley et al. |
| 2008/0298763 A1 | 12/2008 | Appenzeller et al. |
| 2008/0310810 A1 | 12/2008 | Gallagher |
| 2009/0010607 A1 | 1/2009 | Elisson et al. |
| 2009/0016685 A1 | 1/2009 | Hudgins et al. |
| 2009/0022470 A1 | 1/2009 | Krampotich |
| 2009/0038845 A1 | 2/2009 | Fransen et al. |
| 2009/0060439 A1 | 3/2009 | Cox et al. |
| 2009/0060440 A1 | 3/2009 | Wright et al. |
| 2009/0067800 A1 | 3/2009 | Vazquez et al. |
| 2009/0074371 A1 | 3/2009 | Bayazit et al. |
| 2009/0080849 A1 | 3/2009 | Hankins et al. |
| 2009/0097813 A1 | 4/2009 | Hill |
| 2009/0136194 A1 | 5/2009 | Barnes |
| 2009/0136196 A1 | 5/2009 | Trebesch et al. |
| 2009/0146342 A1 | 6/2009 | Haney et al. |
| 2009/0148117 A1 | 6/2009 | Laurisch |
| 2009/0169163 A1 | 7/2009 | Abbott, III et al. |
| 2009/0175588 A1 | 7/2009 | Brandt et al. |
| 2009/0180749 A1 | 7/2009 | Douglas et al. |
| 2009/0185782 A1 | 7/2009 | Parikh et al. |
| 2009/0191891 A1 | 7/2009 | Ma et al. |
| 2009/0194647 A1 | 8/2009 | Keith |
| 2009/0196563 A1 | 8/2009 | Mullsteff et al. |
| 2009/0202214 A1 | 8/2009 | Holmberg et al. |
| 2009/0207577 A1 | 8/2009 | Fransen et al. |
| 2009/0208178 A1 | 8/2009 | Kowalczyk et al. |
| 2009/0208210 A1 | 8/2009 | Trojer et al. |
| 2009/0214171 A1 | 8/2009 | Coburn et al. |
| 2009/0220200 A1 | 9/2009 | Wong et al. |
| 2009/0220204 A1 | 9/2009 | Ruiz |
| 2009/0226142 A1 | 9/2009 | Barnes et al. |
| 2009/0238531 A1 | 9/2009 | Holmberg et al. |
| 2009/0245743 A1 | 10/2009 | Cote et al. |
| 2009/0252472 A1 | 10/2009 | Solheid et al. |
| 2009/0257726 A1 | 10/2009 | Redmann et al. |
| 2009/0257727 A1 | 10/2009 | Laurisch et al. |
| 2009/0257754 A1 | 10/2009 | Theodoras, II et al. |
| 2009/0263096 A1 | 10/2009 | Solheid et al. |
| 2009/0263122 A1 | 10/2009 | Helkey et al. |
| 2009/0267865 A1 | 10/2009 | Miller et al. |
| 2009/0269016 A1 | 10/2009 | Korampally et al. |
| 2009/0269018 A1 | 10/2009 | Frohlich et al. |
| 2009/0274429 A1 | 11/2009 | Krampotich et al. |

(56) References Cited

U.S. PATENT DOCUMENTS

| | | |
|---|---|---|
| 2009/0274430 A1 | 11/2009 | Krampotich et al. |
| 2009/0274432 A1 | 11/2009 | Iwaya |
| 2009/0290842 A1 | 11/2009 | Bran de Leon et al. |
| 2009/0290843 A1 | 11/2009 | Reagan et al. |
| 2009/0297111 A1 | 12/2009 | Reagan et al. |
| 2009/0304342 A1 | 12/2009 | Adomeit et al. |
| 2009/0324189 A1 | 12/2009 | Hill et al. |
| 2010/0003000 A1 | 1/2010 | Rapp et al. |
| 2010/0012671 A1 | 1/2010 | Vrondran et al. |
| 2010/0054681 A1 | 3/2010 | Biribuze et al. |
| 2010/0054682 A1 | 3/2010 | Cooke et al. ............ 385/135 |
| 2010/0054683 A1 | 3/2010 | Cooke et al. |
| 2010/0054684 A1 | 3/2010 | Cooke et al. |
| 2010/0054685 A1 | 3/2010 | Cooke et al. |
| 2010/0054686 A1 | 3/2010 | Cooke et al. |
| 2010/0054687 A1 | 3/2010 | Ye et al. |
| 2010/0061693 A1 | 3/2010 | Bran de Leon et al. |
| 2010/0074587 A1 | 3/2010 | Loeffelholz et al. |
| 2010/0080517 A1 | 4/2010 | Cline et al. |
| 2010/0086274 A1 | 4/2010 | Keith |
| 2010/0111483 A1 | 5/2010 | Reinhardt et al. |
| 2010/0119201 A1 | 5/2010 | Smrha et al. |
| 2010/0129035 A1 | 5/2010 | Teo |
| 2010/0142544 A1 | 6/2010 | Chapel et al. |
| 2010/0142910 A1 | 6/2010 | Hill et al. |
| 2010/0150518 A1 | 6/2010 | Leon et al. |
| 2010/0158467 A1 | 6/2010 | Hou et al. |
| 2010/0166377 A1 | 7/2010 | Nair et al. |
| 2010/0178022 A1 | 7/2010 | Schroeder et al. |
| 2010/0202745 A1 | 8/2010 | Sokolowski et al. |
| 2010/0202748 A1 | 8/2010 | Pierce et al. |
| 2010/0220967 A1 | 9/2010 | Cooke et al. |
| 2010/0220968 A1 | 9/2010 | Dagley et al. |
| 2010/0247051 A1 | 9/2010 | Kowalczyk et al. |
| 2010/0278499 A1 | 11/2010 | Mures et al. |
| 2010/0296790 A1 | 11/2010 | Cooke et al. |
| 2010/0296791 A1 | 11/2010 | Makrides-Saravanos et al. |
| 2010/0310225 A1 | 12/2010 | Anderson et al. |
| 2010/0310226 A1 | 12/2010 | Wakileh et al. |
| 2010/0316334 A1 | 12/2010 | Kewitsch |
| 2010/0322580 A1 | 12/2010 | Beamon et al. |
| 2010/0322582 A1 | 12/2010 | Cooke et al. |
| 2010/0322583 A1 | 12/2010 | Cooke et al. |
| 2010/0329624 A1 | 12/2010 | Zhou et al. |
| 2011/0058786 A1 | 3/2011 | Zimmel |
| 2011/0073730 A1 | 3/2011 | Kitchen |
| 2011/0085774 A1 | 4/2011 | Murphy et al. |
| 2011/0085776 A1 | 4/2011 | Biribuze et al. |
| 2011/0097053 A1 | 4/2011 | Smith et al. |
| 2011/0097977 A1 | 4/2011 | Bubnick et al. |
| 2011/0129186 A1 | 6/2011 | Lewallen et al. |
| 2011/0186532 A1 | 8/2011 | Wu |
| 2011/0211799 A1 | 9/2011 | Conner et al. |
| 2011/0217014 A1 | 9/2011 | Dominique |
| 2011/0268405 A1 | 11/2011 | Cote et al. |
| 2011/0268407 A1 | 11/2011 | Cowen et al. |
| 2011/0268413 A1 | 11/2011 | Cote et al. |
| 2011/0280535 A1 | 11/2011 | Womack |
| 2011/0280537 A1 | 11/2011 | Cowen et al. |
| 2012/0051707 A1 | 3/2012 | Barnes et al. |
| 2012/0057838 A1 | 3/2012 | Hill et al. |
| 2012/0106899 A1 | 5/2012 | Choi |
| 2012/0183263 A1 | 7/2012 | Wu |
| 2012/0183289 A1 | 7/2012 | Lou et al. |
| 2012/0219263 A1 | 8/2012 | Beamon et al. |
| 2012/0288244 A1 | 11/2012 | Wu et al. |
| 2012/0288248 A1 | 11/2012 | Ramirez et al. |
| 2012/0301083 A1 | 11/2012 | Carter et al. |
| 2013/0004136 A1 | 1/2013 | Brower et al. |
| 2013/0077927 A1 | 3/2013 | O'Connor |
| 2013/0243386 A1 | 9/2013 | Pimentel et al. |
| 2013/0266282 A1 | 10/2013 | Cote et al. |
| 2013/0308916 A1 | 11/2013 | Buff et al. |
| 2014/0003782 A1 | 1/2014 | Blackwell, Jr. et al. |
| 2014/0010510 A1 | 1/2014 | Blackard |
| 2014/0112628 A1 | 4/2014 | Keenum et al. |

FOREIGN PATENT DOCUMENTS

| | | |
|---|---|---|
| CA | 2186314 A1 | 4/1997 |
| CA | 2765835 A1 | 1/2011 |
| CH | 688705 A5 | 1/1998 |
| CN | 102460258 A | 5/2012 |
| DE | 8711970 U1 | 10/1987 |
| DE | 3726718 A1 | 2/1989 |
| DE | 3726719 A1 | 2/1989 |
| DE | 4030301 A1 | 3/1992 |
| DE | 4231181 C1 | 8/1993 |
| DE | 20115940 U1 | 1/2002 |
| DE | 10338848 A1 | 3/2005 |
| DE | 202005009932 U1 | 11/2005 |
| DE | 202010009385 U1 | 9/2010 |
| EP | 29512 A1 | 6/1981 |
| EP | 0250900 A2 | 1/1988 |
| EP | 0408266 A2 | 1/1991 |
| EP | 0474091 A1 | 8/1991 |
| EP | 0468671 A1 | 1/1992 |
| EP | 0490698 A1 | 6/1992 |
| EP | 0529830 A1 | 3/1993 |
| EP | 0544004 A1 | 6/1993 |
| EP | 0547778 A1 | 6/1993 |
| EP | 0581527 A1 | 2/1994 |
| EP | 0620462 A1 | 10/1994 |
| EP | 0693699 A1 | 1/1996 |
| EP | 0720322 A2 | 7/1996 |
| EP | 0776557 B1 | 6/1997 |
| EP | 0940700 A2 | 9/1999 |
| EP | 0949522 A2 | 10/1999 |
| EP | 1041417 A2 | 10/2000 |
| EP | 1056177 A1 | 11/2000 |
| EP | 1065542 A1 | 1/2001 |
| EP | 1203974 A2 | 5/2002 |
| EP | 1289319 A2 | 3/2003 |
| EP | 1310816 A2 | 5/2003 |
| EP | 1316829 A2 | 6/2003 |
| EP | 1621907 A1 | 2/2006 |
| EP | 1777563 A1 | 4/2007 |
| EP | 2159613 A2 | 3/2010 |
| FR | 2378378 A1 | 8/1978 |
| GB | 2241591 A | 9/1991 |
| GB | 2277812 A | 11/1994 |
| JP | 3172806 A | 7/1991 |
| JP | 5045541 A | 2/1993 |
| JP | 06018749 A | 1/1994 |
| JP | 7308011 A | 11/1995 |
| JP | 8007308 A | 1/1996 |
| JP | 8248235 A | 9/1996 |
| JP | 8248237 A | 9/1996 |
| JP | 3487946 A | 10/1996 |
| JP | 8254620 A | 10/1996 |
| JP | 3279474 A | 10/1997 |
| JP | 9258033 A | 10/1997 |
| JP | 9258055 A | 10/1997 |
| JP | 2771870 B2 | 7/1998 |
| JP | 3448448 A | 8/1998 |
| JP | 10227919 A | 8/1998 |
| JP | 3478944 A | 12/1998 |
| JP | 10332945 A | 12/1998 |
| JP | 10339817 A | 12/1998 |
| JP | 11023858 A | 1/1999 |
| JP | 2000098138 A | 4/2000 |
| JP | 2000098139 A | 4/2000 |
| JP | 2001004849 A | 1/2001 |
| JP | 3160322 B2 | 4/2001 |
| JP | 2001133636 A | 5/2001 |
| JP | 3173962 B2 | 6/2001 |
| JP | 3176906 B2 | 6/2001 |
| JP | 2001154030 A | 6/2001 |
| JP | 2001159714 A | 6/2001 |
| JP | 2002022974 A | 1/2002 |
| JP | 2002169035 A | 6/2002 |
| JP | 3312893 B2 | 8/2002 |

(56) References Cited

FOREIGN PATENT DOCUMENTS

| | | |
|---|---|---|
| JP | 2002305389 A | 10/2002 |
| JP | 2003029054 A | 1/2003 |
| JP | 3403573 B2 | 5/2003 |
| JP | 2003169026 A | 6/2003 |
| JP | 2003215353 A | 7/2003 |
| JP | 2003344701 A | 12/2003 |
| JP | 3516765 B2 | 4/2004 |
| JP | 2004144808 A | 5/2004 |
| JP | 2004514931 A | 5/2004 |
| JP | 3542939 B2 | 7/2004 |
| JP | 2004246147 A | 9/2004 |
| JP | 2004361652 A | 12/2004 |
| JP | 2004361893 A | 12/2004 |
| JP | 3107704 U | 2/2005 |
| JP | 2005055748 A | 3/2005 |
| JP | 2005062569 A | 3/2005 |
| JP | 2005084241 A | 3/2005 |
| JP | 2005148327 A | 6/2005 |
| JP | 3763645 B2 | 4/2006 |
| JP | 3778021 B2 | 5/2006 |
| JP | 2006126513 A | 5/2006 |
| JP | 2006126516 A | 5/2006 |
| JP | 3794540 B2 | 7/2006 |
| JP | 2006227041 A1 | 8/2006 |
| JP | 3833638 B2 | 10/2006 |
| JP | 3841344 B2 | 11/2006 |
| JP | 3847533 B2 | 11/2006 |
| JP | 3896035 B2 | 3/2007 |
| JP | 2007067458 A1 | 3/2007 |
| JP | 3934052 B2 | 6/2007 |
| JP | 3964191 B2 | 8/2007 |
| JP | 3989853 B2 | 10/2007 |
| JP | 4026244 B2 | 12/2007 |
| JP | 4029494 B2 | 1/2008 |
| JP | 4065223 B2 | 3/2008 |
| JP | 4093475 B2 | 6/2008 |
| JP | 4105696 B2 | 6/2008 |
| JP | 4112437 B2 | 7/2008 |
| JP | 4118862 B2 | 7/2008 |
| JP | 2008176118 A1 | 7/2008 |
| JP | 2008180817 A1 | 8/2008 |
| JP | 4184329 B2 | 11/2008 |
| JP | 2008542822 T | 11/2008 |
| JP | 2009503582 T | 1/2009 |
| WO | 9105281 A1 | 4/1991 |
| WO | 9326070 A1 | 12/1993 |
| WO | 9520175 A1 | 7/1995 |
| WO | 9636896 A1 | 11/1996 |
| WO | 9638752 A1 | 12/1996 |
| WO | 9712268 A1 | 4/1997 |
| WO | 9744605 A1 | 11/1997 |
| WO | 9825416 A1 | 6/1998 |
| WO | 0005611 A2 | 2/2000 |
| WO | 0127660 A2 | 4/2001 |
| WO | 0242818 A1 | 5/2002 |
| WO | 03009527 A2 | 1/2003 |
| WO | 2004052066 A1 | 6/2004 |
| WO | 2007050515 A1 | 5/2007 |
| WO | 2007079074 A2 | 7/2007 |
| WO | 2007149215 A2 | 12/2007 |
| WO | 2008063054 A2 | 5/2008 |
| WO | 2008113054 A2 | 9/2008 |
| WO | 2008157248 A1 | 12/2008 |
| WO | 2009120280 A2 | 10/2009 |
| WO | 2011005461 A1 | 1/2011 |

OTHER PUBLICATIONS

International Search Report for PCT/US2011/030448 mailed Jul. 20, 2011, 2 pages.
International Search Report for PCT/US2011/030466 mailed Aug. 5, 2011, 2 pages.
Non-final Office Action for U.S. Appl. No. 13/649,417 mailed Feb. 13, 2014, 10 pages.
Final Office Action for U.S. Appl. No. 13/649,417 mailed Jun. 25, 2014, 9 pages.
Notice of Allowance for U.S. Appl. No. 13/649,417 mailed Sep. 8, 2014, 7 pages.
Non-final Office Action for U.S. Appl. No. 12/956,446 mailed Dec. 5, 2014, 12 pages.
Advisory Action for U.S. Appl. No. 13/663,975 mailed Dec. 24, 2014, 7 pages.
Advisory Action for U.S. Appl. No. 12/394,114 mailed Jan. 16, 2015, 3 pages.
Non-final Office Action for U.S. Appl. No. 12/818,986 mailed Jan. 5, 2015, 21 pages.
Notice of Allowance for U.S. Appl. No. 13/649,417 mailed Jan. 8, 2015, 7 pages.
Non-final Office Action for U.S. Appl. No. 12/946,217 mailed Dec. 29, 2014, 50 pages.
Notice of Allowance and Examiner-Initiated Interview Summary for U.S. Appl. No. 12/940,585 mailed Feb. 27, 2015, 16 pages.
Notice of Allowance for U.S. Appl. No. 12/953,101 mailed Feb. 20, 2015, 9 pages.
Final Office Action for U.S. Appl. No. 12/953,003 mailed Feb. 12, 2015, 14 pages.
Final Office Action for U.S. Appl. No. 12/953,039 mailed Feb. 23, 2015, 9 pages.
Notice of Allowance for U.S. Appl. No. 13/688,675 mailed Jan. 26, 2015, 7 pages.
Final Office Action for U.S. Appl. No. 12/819,065 mailed Mar. 12, 2015, 13 pages.
Examiner's Answer to the Appeal Brief for U.S. Appl. No. 12/946,139 mailed Feb. 5, 2015, 12 pages.
Notice of Allowance for U.S. Appl. No. 12/707,889 mailed Feb. 17, 2015, 7 pages.
Non-final Office Action for U.S. Appl. No. 13/902,012 mailed Feb. 17, 2015, 9 pages.
Non-final Office Action for U.S. Appl. No. 13/081,856 mailed Feb. 9, 2015, 8 pages.
Patent Cooperation Treaty International Search Report, Application No. PCT/US2011/057582, Jan. 27, 2012, 3 pages.
Final Office Action for U.S. Appl. No. 12/394,114 mailed Oct. 25, 2012, 8 pages.
Non-final Office Action for U.S. Appl. No. 12/915,682 mailed Oct. 24, 2012, 8 pages.
Non-final Office Action for U.S. Appl. No. 12/818,986 mailed Feb. 3, 2012, 12 pages.
Final Office Action for U.S. Appl. No. 12/818,986 mailed Oct. 18, 2012, 13 pages.
Non-final Office Action for U.S. Appl. No. 12/952,960 mailed Oct. 4, 2012, 11 pages.
Non-final Office Action for U.S. Appl. No. 12/953,134 mailed Sep. 25, 2012, 8 pages.
Non-final Office Action for U.S. Appl. No. 12/953,039 mailed Jan. 11, 2013, 6 pages.
Non-final Office Action for U.S. Appl. No. 12/952,912 mailed Dec. 28, 2012, 9 pages.
Non-final Office Action for U.S. Appl. No. 12/953,118 mailed Jan. 7, 2013, 9 pages.
Non-final Office Action for U.S. Appl. No. 12/953,536 mailed Jan. 2, 2013, 20 pages.
Non-final Office Action for U.S. Appl. No. 12/707,889 mailed Jan. 2, 2013, 7 pages.
European Search Report for patent application 10790017.7 mailed Nov. 8, 2012, 7 pages.
Examination Report for European patent application 09789090.9-2216 mailed Aug. 29, 2011, 4 pages.
Examination Report for European patent application 09789090.9-2216 mailed Mar. 30, 2012, 6 pages.
Written Opinion of the International Searching Authority for International patent application PCT/US2009004548, mailed Apr. 5, 2011, 6 pages.
European Search Report for European patent application 09789090.9-2217 mailed Jan. 24, 2013, 5 pages.
Non-final Office Action for U.S. Appl. No. 12/946,139 mailed Jul. 26, 2012, 12 pages.

(56) References Cited

OTHER PUBLICATIONS

Final Office Action for U.S. Appl. No. 12/946,139 mailed Feb. 15, 2013, 17 pages.
Non-final Office Action for U.S. Appl. No. 12/751,884 mailed Feb. 15, 2013, 5 pages.
Non-final Office Action for U.S. Appl. No. 12/394,114 mailed Feb. 27, 2013, 8 pages.
Non-final Office Action for U.S. Appl. No. 12/819,065 mailed Mar. 4, 2013, 7 pages.
Final Office Action for U.S. Appl. No. 12/952,960 mailed Mar. 7, 2013, 13 pages.
Notice of Allowance for U.S. Appl. No. 12/732,487 mailed Mar. 19, 2013, 11 pages.
Non-final Office Action for U.S. Appl. No. 12/953,134 mailed Mar. 21, 2013, 9 pages.
Final Office Action for U.S. Appl. No. 12/641,617 mailed May 10, 2013, 21 pages.
Notice of Allowance for U.S. Appl. No. 13/090,621 mailed Apr. 22, 2013, 8 pages.
Final Office Action for U.S. Appl. No. 12/953,039 mailed May 1, 2013, 8 pages.
Final Office Action for U.S. Appl. No. 12/953,118 mailed May 3, 2013, 11 pages.
Final Office Action for U.S. Appl. No. 12/915,682 mailed Apr. 18, 2013, 9 pages.
Advisory Action for U.S. Appl. No. 12/952,960 mailed May 15, 2013, 2 pages.
Non-final Office Action for U.S. Appl. No. 12/952,960 mailed Jun. 20, 2013, 13 pages.
Non-final Office Action for U.S. Appl. No. 12/953,536 mailed Jun. 6, 2013, 21 pages.
Non-final Office Action for U.S. Appl. No. 11/820,300 mailed Apr. 25, 2012, 10 pages.
Final Office Action for U.S. Appl. No. 12/871,052 mailed Jul. 1, 2013, 12 pages.
Non-final Office Action for U.S. Appl. No. 12/940,699 mailed Jun. 26, 2013, 9 pages.
Notice of Allowance for U.S. Appl. No. 13/090,621 mailed Jun. 25, 2013, 8 pages.
Non-final Office Action for U.S. Appl. No. 12/956,475 mailed Oct. 4, 2012, 7 pages.
Non-final Office Action for U.S. Appl. No. 13/302,067 mailed Jun. 7, 2013, 13 pages.
Final Office Action for U.S. Appl. No. 12/771,473 mailed Jul. 19, 2013, 7 pages.
Notice of Allowance for U.S. Appl. No. 12/751,884 mailed Jul. 17, 2013, 8 pages.
Non-final Office Action for U.S. Appl. No. 12/940,585 mailed Aug. 16, 2013, 14 pages.
Final Office Action for U.S. Appl. No. 12/953,134 mailed Aug. 23, 2013, 11 pages.
Ex parte Quayle Action for U.S. Appl. No. 12/953,164 mailed Aug. 16, 2013, 5 pages.
Non-final Office Action for U.S. Appl. No. 12/732,487 mailed Jul. 17, 2013, 22 pages.
Advisory Action for U.S. Appl. No. 12/953,039 mailed Jul. 12, 2013, 3 pages.
Advisory Action for U.S. Appl. No. 12/953,118 mailed Jul. 12, 2013, 3 pages.
Advisory Action for U.S. Appl. No. 12/641,617 mailed Jul. 29, 2013, 3 pages.
Final Office Action for U.S. Appl. No. 12/952,912 mailed Aug. 30, 2013, 15 pages.
Advisory Action for U.S. Appl. No. 12/771,473 mailed Oct. 2, 2013, 3 pages.
Notice of Allowance for U.S. Appl. No. 12/641,617 mailed Sep. 4, 2013, 9 pages.
Annex to Form PCT/ISA/2006, Communication Relating to the Results of the Partial International Search, for PCT/US2009/004549 mailed Feb. 10, 2010, 2 pages.
Annex to Form PCT/ISA/206, Communication Relating to the Results of the Partial International Search, for PCT/US2009/004548 mailed Jan. 19, 2010, 2 pages.
Corning Cable Systems, "Corning Cable Systems Products for BellSouth High Density Shelves," Jun. 2000, 2 pages.
Corning Cable Systems, "Corning Cable Systems Quick Reference Guide for Verizon FTTP FDH Products," Jun. 2005, 4 pages.
Conner, M. "Passive Optical Design for RFOG and Beyond," Braodband Properties, Apr. 2009, pp. 78-81.
Corning Evolant, "Eclipse Hardware Family," Nov. 2009, 1 page.
Corning Evolant, "Enhanced Management Frame," Dec. 2009, 1 page.
Corning Evolant, "Enhanced Management Frame (EMF)," Specification Sheet, Nov. 2009, 24 pages.
Corning Cable Systems, "Evolant Solutions for Evolving Networks: Fiber Optic Hardware," Oct. 2002, 2 pages.
Corning Cable Systems, "Fiber Optic Hardware with Factory-Installed Pigtails: Features and Benefits," Nov. 2010, 12 pages.
Corning Cable Systems, "FiberManager System 1- and 3-Position Compact Shelves," Jan. 2003, 4 pages.
Corning Cable Systems, "FiberManager System Frame and Components," Jan. 2003, 12 pages.
Corning Cable Systems, "High Density Frame," Jul. 2001, 2 pages.
Corning Cable Systems, "High Density Frame (HDF) Connector-Splice Shelves and Housings," May 2003, 4 pages.
International Search Report for PCT/US10/35529 mailed Jul. 23, 2010, 2 pages.
International Search Report for PCT/US10/35563 mailed Jul. 23, 2012, 1 page.
International Search Report for PCT/US2008/002514 mailed Aug. 8, 2008, 2 pages.
International Search Report for PCT/US2008/010317 mailed Mar. 4, 2008, 2 pages.
International Search Report for PCT/US2009/001692 mailed Nov. 24, 2009, 5 pages.
International Search Report for PCT/US2010/024888 mailed Jun. 23, 2010, 5 pages.
International Search Report for PCT/US2010/027402 mailed Jun. 16, 2010, 2 pages.
Corning Cable Systems, "MTX Frames and Accessories," Feb. 2006, 4 pages.
Panduit, "Lock-in LC Duplex Clip," Accessed Mar. 22, 2012, 1 page.
International Search Report for PCT/US06/49351 mailed Apr. 25, 2008, 1 page.
International Search Report for PCT/US09/57069 mailed Mar. 24, 2010, 2 pages.
International Search Report for PCT/US2009/057244 mailed Nov. 9, 2009 3 pages.
International Search Report for PCTUS2009004548 mailed Mar. 19, 2010, 5 pages.
International Search Report for PCTUS2009004549 mailed Apr. 20, 2010, 6 pages.
Siecor, "Single Shelf HDF with Slack Storage and Heat Shield (HH1-CSH-1238-1V-BS)," Jan. 1998, 12 pages.
Corning Cable Systems, "Mass Termination Xchange (MTX) Frame System Equipment Office Planning and Application Guide," SRP003-664, Issue 1, Mar. 2005, 57 pages.
Corning Cable Systems, "Mass Termination Xchange (MTX) Equipment Patch Cord Interbay Vertical Channel," SRP003-684, Issue 1, Mar. 2005, 8 pages.
Corning Cable Systems, "High Density Frame (HDF) Installation," SRP003-355, Issue 4, Sep. 2002, 18 pages.
Written Opinion for PCT/US2010/023901 mailed Aug. 25, 2011, 8 pages.
Advisory Action for U.S. Appl. No. 12/221,117 mailed Aug. 24, 2011, 3 pages.
Examiner's Answer to Appeal Brief for U.S. Appl. No. 12/221,117 mailed Mar. 29, 2012, 16 pages.
Final Office Action for U.S. Appl. No. 12/221,117 mailed Feb. 19, 2010, 7 pages.
Final Office Action for U.S. Appl. No. 12/221,117 mailed Jun. 10, 2011, 8 pages.

(56) References Cited

OTHER PUBLICATIONS

Non-final Office Action for U.S. Appl. No. 12/221,117 mailed Jul. 14, 2010, 7 pages.
Non-final Office Action for U.S. Appl. No. 12/221,117 mailed Jun. 9, 2009, 5 pages.
Non-final Office Action for U.S. Appl. No. 12/221,117 mailed Dec. 21, 2010, 7 pages.
Advisory Action for U.S. Appl. No. 12/394,483 mailed Feb. 16, 2012, 3 pages.
Final Office Action for U.S. Appl. No. 12/394,483 mailed Dec. 6, 2011, 14 pages.
Non-final Office Action for U.S. Appl. No. 12/394,483 mailed Jun. 17, 2011, 11 pages.
Advisory Action for U.S. Appl. No. 12/950,234 mailed Dec. 21, 2011, 3 pages.
Non-final Office Action for U.S. Appl. No. 12/950,234 mailed Jun. 17, 2011, 7 pages.
Non-final Office Action for U.S. Appl. No. 12/950,234 mailed Mar. 12, 2012, 10 pages.
Final Office Action for U.S. Appl. No. 12/950,234 mailed Oct. 14, 2011, 10 pages.
Advisory Action mailed May 12, 2011, for U.S. Appl. No. 12/323,423, 3 pages.
Final Rejection mailed Mar. 3, 2011, for U.S. Appl. No. 12/323,423, 17 pages.
Non-Final Rejection mailed Aug. 5, 2011, for U.S. Appl. No. 12/323,423, 13 pages.
Non-Final Rejection mailed Sep. 7, 2010, for U.S. Appl. No. 12/323,423, 18 pages.
Notice of Allowance for U.S. Appl. No. 12/323,423 mailed Jan. 24, 2012, 8 pages.
Examiner's Answer mailed Mar. 4, 2011, for U.S. Appl. No. 12/323,415, 11 pages.
Final Rejection mailed Jun. 25, 2010, for U.S. Appl. No. 12/323,415, 10 pages.
Non-Final Rejection mailed Aug. 5, 2011, for U.S. Appl. No. 12/323,415, 41 pages.
Non-final Office Action for U.S. Appl. No. 12/323,415 mailed Apr. 23, 2012, 11 pages.
Non-Final Rejection mailed Dec. 10, 2009, for U.S. Appl. No. 12/323,415, 7 pages.
Examiner's Answer to Appeal Brief for U.S. Appl. No. 11/320,062 mailed Dec. 8, 2011, 8 pages.
Final Office Action for U.S. Appl. No. 11/320,062 mailed Mar. 8, 2011, 8 pages.
Non-final Office Action for U.S. Appl. No. 11/320,062 mailed Jan. 15, 2010, 11 pages.
Non-final Office Action for U.S. Appl. No. 11/320,062 mailed Sep. 30, 2010, 7 pages.
Final Office Action for U.S. Appl. No. 11/439,086 mailed Feb. 4, 2010, 14 pages.
Non-final Office Action for U.S. Appl. No. 11/439,086 mailed May 3, 2010, 11 pages.
Non-final Office Action for U.S. Appl. No. 11/439,086 mailed Sep. 21, 2009, 10 pages.
Final Office Action for U.S. Appl. No. 12/079,481 mailed Mar. 18, 2010, 10 pages.
Non-final Office Action for U.S. Appl. No. 12/079,481 mailed Dec. 26, 2008, 9 pages.
Non-final Office Action for U.S. Appl. No. 12/079,481 mailed Sep. 16, 2009, 10 pages.
Notice of Allowance for U.S. Appl. No. 12/079,481 mailed Jun. 3, 2010, 6 pages.
Notice of Allowance for U.S. Appl. No. 12/079,481 mailed Oct. 4, 2010, 4 pages.
Final Office Action for U.S. Appl. No. 12/394,114 mailed Dec. 22, 2011, 8 pages.
Non-final Office Action for U.S. Appl. No. 12/394,114 mailed Mar. 16, 2012, 8 pages.
Non-final Office Action for U.S. Appl. No. 12/394,114 mailed Sep. 1, 2011, 7 pages.
Non-final Office Action for U.S. Appl. No. 12/323,373 mailed May 3, 2012, 7 pages.
Non-final Office Action for U.S. Appl. No. 11/809,474 mailed Apr. 8, 2008, 13 pages.
Non-final Office Action for U.S. Appl. No. 11/809,474 mailed Nov. 13, 2008, 10 pages.
Notice of Allowance for U.S. Appl. No. 11/809,474 mailed Jul. 6, 2009, 6 pages.
Final Office Action for U.S. Appl. No. 11/320,031 mailed Mar. 8, 2011, 8 pages.
Non-final Office Action for U.S. Appl. No. 11/320,031 mailed Jan. 5, 2010, 16 pages.
Non-final Office Action for U.S. Appl. No. 11/320,031 mailed Sep. 30, 2010, 7 pages.
Notice of Allowance for U.S. Appl. No. 11/320,031 mailed Nov. 15, 2011, 7 pages.
Non-final Office Action for U.S. Appl. No. 12/157,622 mailed Mar. 31, 2009, 9 pages.
Non-final Office Action for U.S. Appl. No. 12/157,622 mailed Oct. 15, 2009, 9 pages.
Notice of Allowance for U.S. Appl. No. 12/157,622 mailed Apr. 22, 2010, 4 pages.
Non-final Office Action for U.S. Appl. No. 12/323,395 mailed Dec. 8, 2011, 7 pages.
Non-final Office Action for U.S. Appl. No. 12/415,454 mailed Mar. 2, 2012, 5 pages.
Non-final Office Action for U.S. Appl. No. 12/415,454 mailed Sep. 6, 2011, 7 pages.
Notice of Allowance for U.S. Appl. No. 12/415,454 mailed Jan. 13, 2012, 5 pages.
Non-final Office Action for U.S. Appl. No. 12/576,769 mailed Feb. 2, 2012, 23 pages.
Notice of Allowance for U.S. Appl. No. 12/415,454 mailed Jun. 19, 2012, 5 pages.
Non-final Office Action for U.S. Appl. No. 13/603,894 mailed Oct. 3, 2013, 9 pages.
International Search Report for PCT/US2009/066779 mailed Aug. 27, 2010, 3 pages.
"MPO Fiber Optic Rack Panels now available from L-com Connectivity Products," article dated Jun. 4, 2007, 16 pages, http://www.I-com.com/content/Article.aspx?Type=P&ID=438.
"19" Rack Panel with 16 MPO Fiber Optic Couplers—1U high," product page, accessed Oct. 23, 2012, 2 pages, http://www.I-com.com/item.aspx?id=9767#.UlbgG8XXay5.
"Drawing for L-com 1U Panel with 16 MTP couplers," May 15, 2007, 1 page, http://www.I-com.com/multimedia/eng_drawings/PR17516MTP.pdf.
Non-final Office Action for U.S. Appl. No. 12/771,473 mailed Oct. 4, 2012, 6 pages.
Non-final Office Action for U.S. Appl. No. 12/819,081 mailed Aug. 21, 2012, 12 pages.
International Search Report for PCT/US2010/038986 mailed Aug. 18, 2010, 1 page.
International Search Report for PCT/US2010/023901 mailed Jun. 11, 2010, 3 pages.
Notice of Allowance for U.S. Appl. No. 12/576,769 mailed May 31, 2012, 9 pages.
Non-final Office Action for U.S. Appl. No. 12/576,806 mailed Dec. 13, 2011, 6 pages.
Notice of Allowance for U.S. Appl. No. 12/576,806 mailed Apr. 18, 2012, 5 pages.
Non-final Office Action for U.S. Appl. No. 13/688,675 mailed Jan. 31, 2014, 13 pages.
Non-final Office Action for U.S. Appl. No. 12/946,217 mailed Jul. 26, 2012, 25 pages.
Final Office Action for U.S. Appl. No. 12/946,217 mailed Mar. 18, 2013, 48 pages.
Non-final Office Action for U.S. Appl. No. 12/946,217 mailed Oct. 3, 2013, 47 pages.
Final Office Action for U.S. Appl. No. 12/946,217 mailed Apr. 25, 2014, 40 pages.

(56) References Cited

OTHER PUBLICATIONS

Non-final Office Action for U.S. Appl. No. 13/833,876 mailed Apr. 24, 2014, 7 pages.
Notice of Allowance for U.S. Appl. No. 12/953,536 mailed May 20, 2014, 9 pages.
Advisory Action for U.S. Appl. No. 12/707,889 mailed Jun. 11, 2014, 4 pages.
Advisory Action for U.S. Appl. No. 12/940,585 mailed Jun. 17, 2014, 3 pages.
Advisory Action for U.S. Appl. No. 12/947,883 mailed Jun. 19, 2014, 3 pages.
Non-final Office Action for U.S. Appl. No. 12/732,487 mailed Jun. 20, 2014, 24 pages.
Non-final Office Action for U.S. Appl. No. 13/621,958 mailed Jun. 20, 2014, 13 pages.
Non-final Office Action for U.S. Appl. No. 12/952,960 mailed Jun. 26, 2014, 13 pages.
Non-final Office Action for U.S. Appl. No. 13/746,938 mailed Jul. 11, 2014, 9 pages.
Non-final Office Action for U.S. Appl. No. 12/751,895 mailed May 20, 2014, 9 pages.
Final Office Action for U.S. Appl. No. 12/953,039 mailed Jul. 25, 2014, 10 pages.
Notice of Allowance for U.S. Appl. No. 12/953,536 mailed Aug. 28, 2014, 9 pages.
Final Office Action for U.S. Appl. No. 13/901,074 mailed Sep. 5, 2014, 7 pages.
Final Office Action for U.S. Appl. No. 13/663,975 mailed Aug. 14, 2014, 42 pages.
Corrected Notice of Allowance for U.S. Appl. No. 13/533,093 mailed Sep. 2, 2014, 7 pages.
Examiner's Answer to the Appeal for U.S. Appl. No. 12/952,912 mailed Sep. 11, 2014, 15 pages.
Advisory Action and Examiner-Initiated Interview Summary for U.S. Appl. No. 13/081,856 mailed Sep. 16, 2014, 4 pages.
Notice of Allowance for U.S. Appl. No. 13/455,646 mailed Sep. 26, 2014, 9 pages.
Non-Final Office Action for U.S. Appl. No. 13/663,949 mailed Sep. 25, 2014, 21 pages.
Non-Final Office Action for U.S. Appl. No. 13/688,675 mailed Sep. 30, 2014, 9 pages.
Advisory Action for U.S. Appl. No. 12/953,039 mailed Oct. 3, 2014, 3 pages.
Notice of Allowance for U.S. Appl. No. 13/597,549 mailed Oct. 3, 2014, 8 pages.
Decision on Appeal for U.S. Appl. No. 11/320,062 mailed Aug. 14, 2014, 8 pages.
Final Office Action for U.S. Appl. No. 12/953,101 mailed Oct. 20, 2014, 14 pages.
Notice of Allowance for U.S. Appl. No. 13/533,093 mailed Oct. 17, 2014, 9 pages.
Notice of Allowance for U.S. Appl. No. 12/732,487 mailed Oct. 7, 2014, 8 pages.
Non-Final Office Action for U.S. Appl. No. 13/567,288 mailed Oct. 8, 2014, 7 pages.
Advisory Action for U.S. Appl. No. 12/818,986 mailed Oct. 15, 2014, 5 pages.
Examiner's Answer to the Appeal Brief for U.S. Appl. No. 12/953,134 mailed Aug. 1, 2014, 7 pages.
Final Office Action for U.S. Appl. No. 12/394,114 mailed Oct. 31, 2014, 10 pages.
Non-final Office Action for U.S. Appl. No. 12/940,699 mailed Oct. 28, 2014, 9 pages.
Non-final Office Action for U.S. Appl. No. 12/953,039 mailed Nov. 12, 2014, 8 pages.
Notice of Allowance for U.S. Appl. No. 12/952,960 mailed Nov. 10, 2014, 7 pages.
Notice of Allowance for U.S. Appl. No. 13/081,856 mailed Oct. 29, 2014, 10 pages.
Notice of Allowance for U.S. Appl. No. 13/833,876 mailed Nov. 7, 2014, 7 pages.
Advisory Action for U.S. Appl. No. 13/901,074 mailed Nov. 24, 2014, 3 pages.
Notice of Allowance for U.S. Appl. No. 12/751,895 mailed Nov. 19, 2014, 8 pages.

* cited by examiner

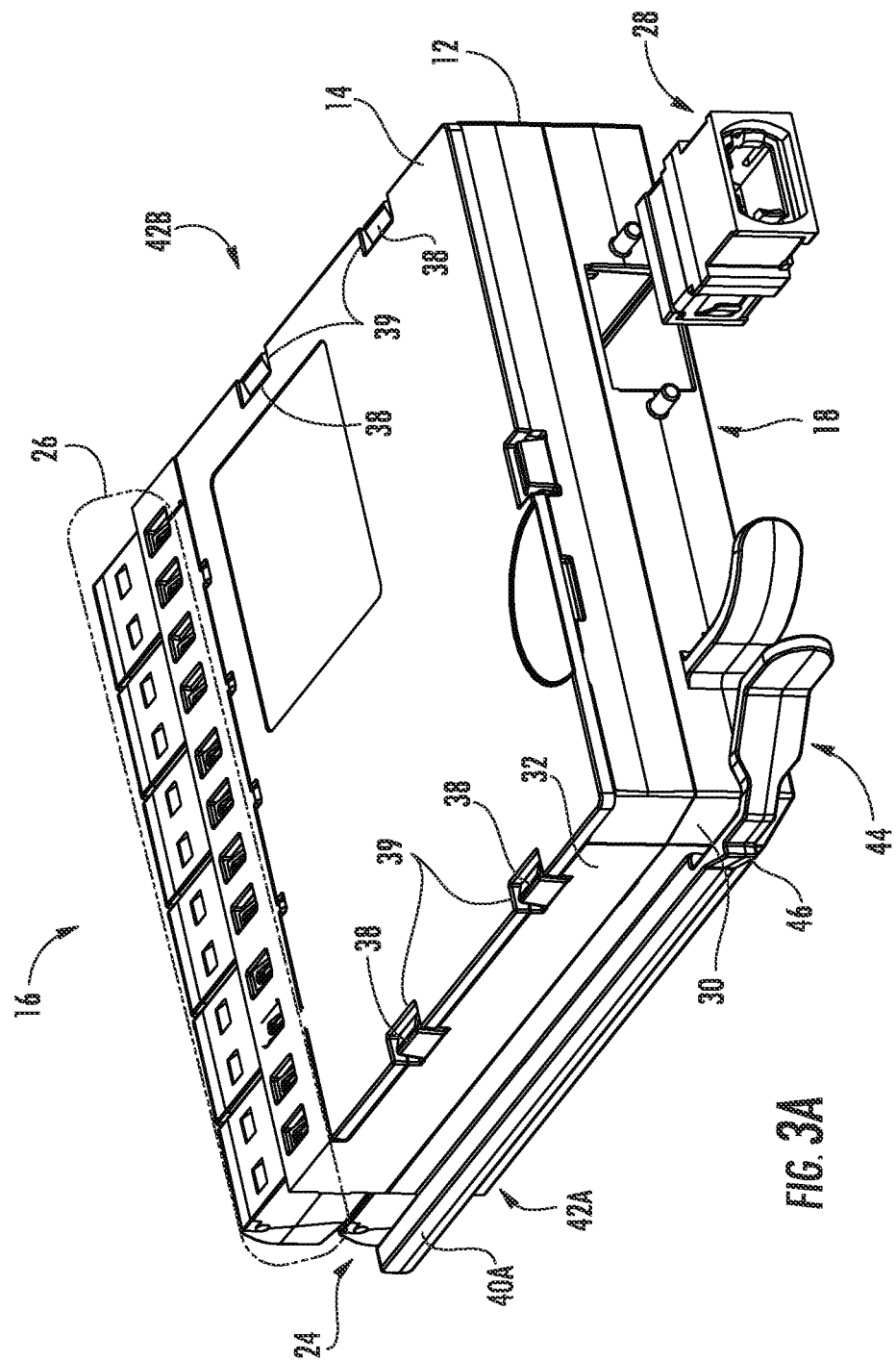

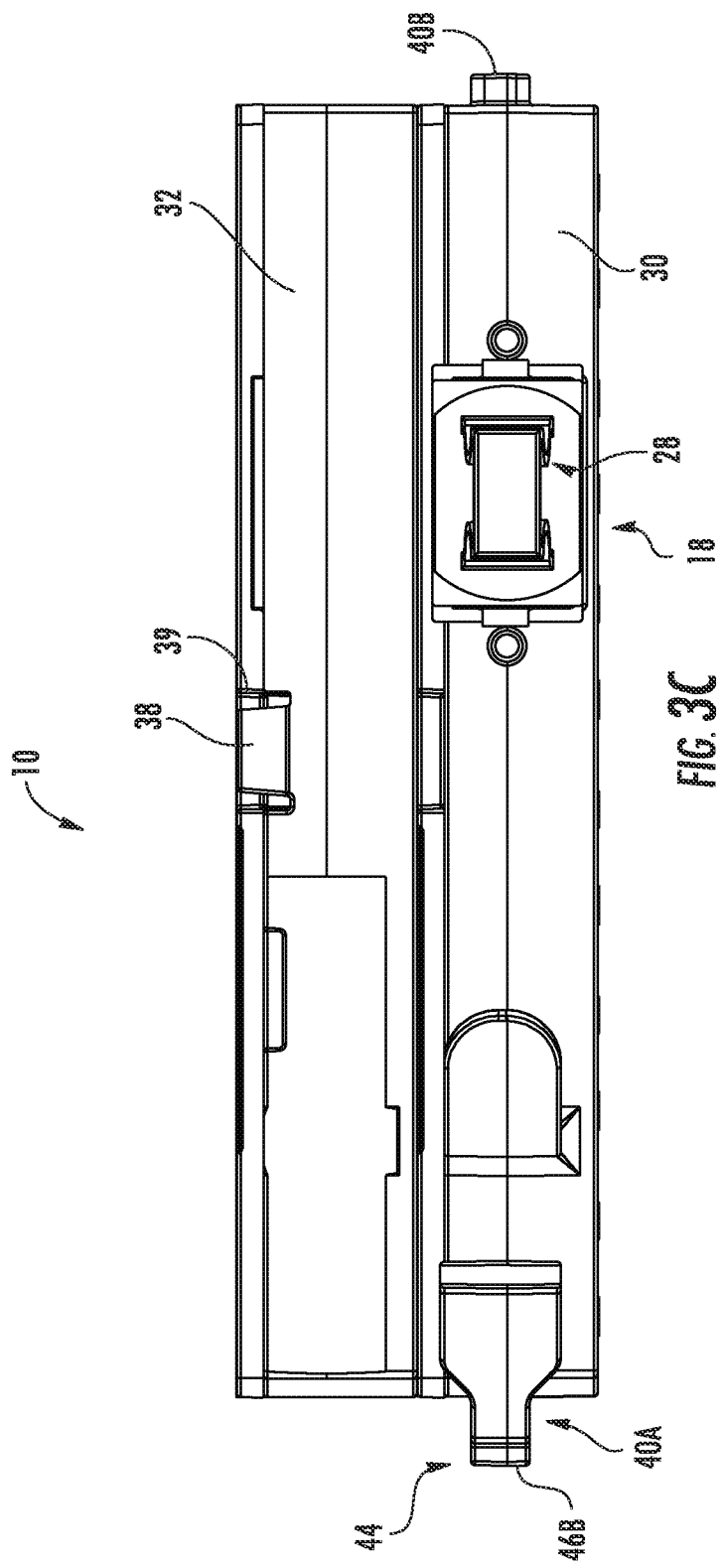

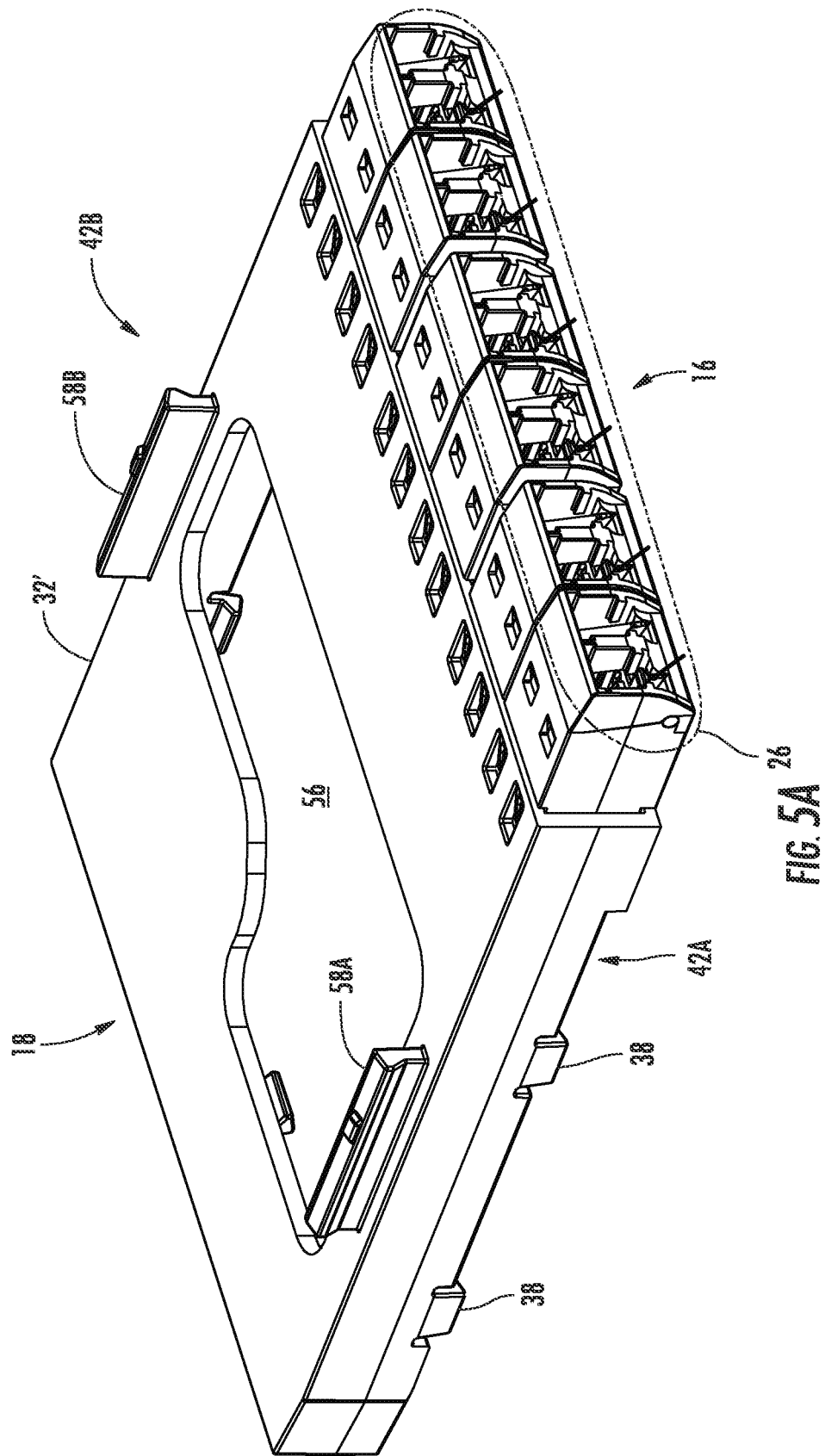

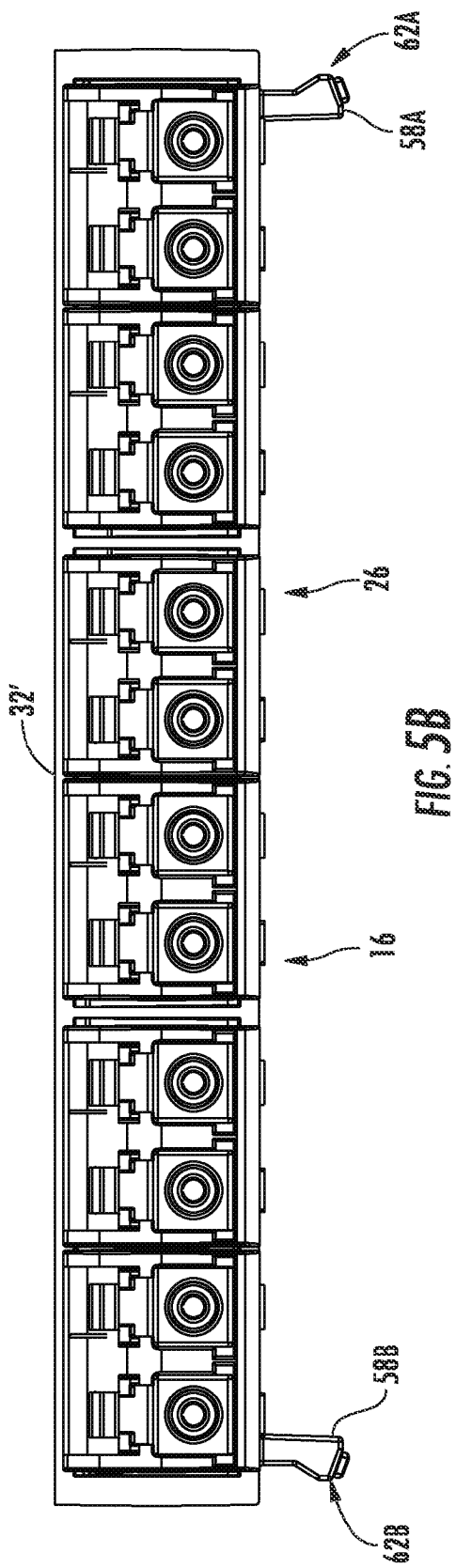

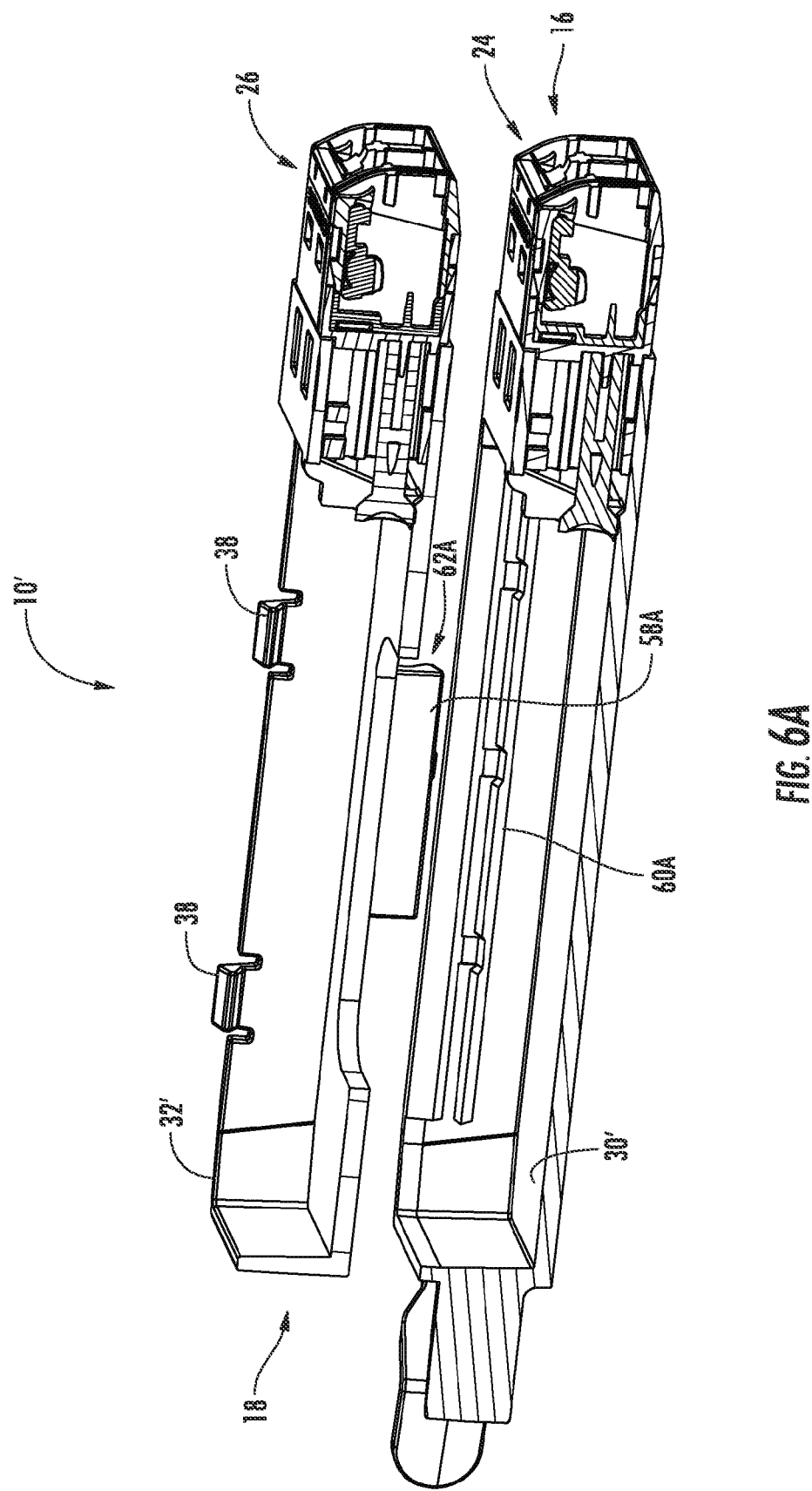

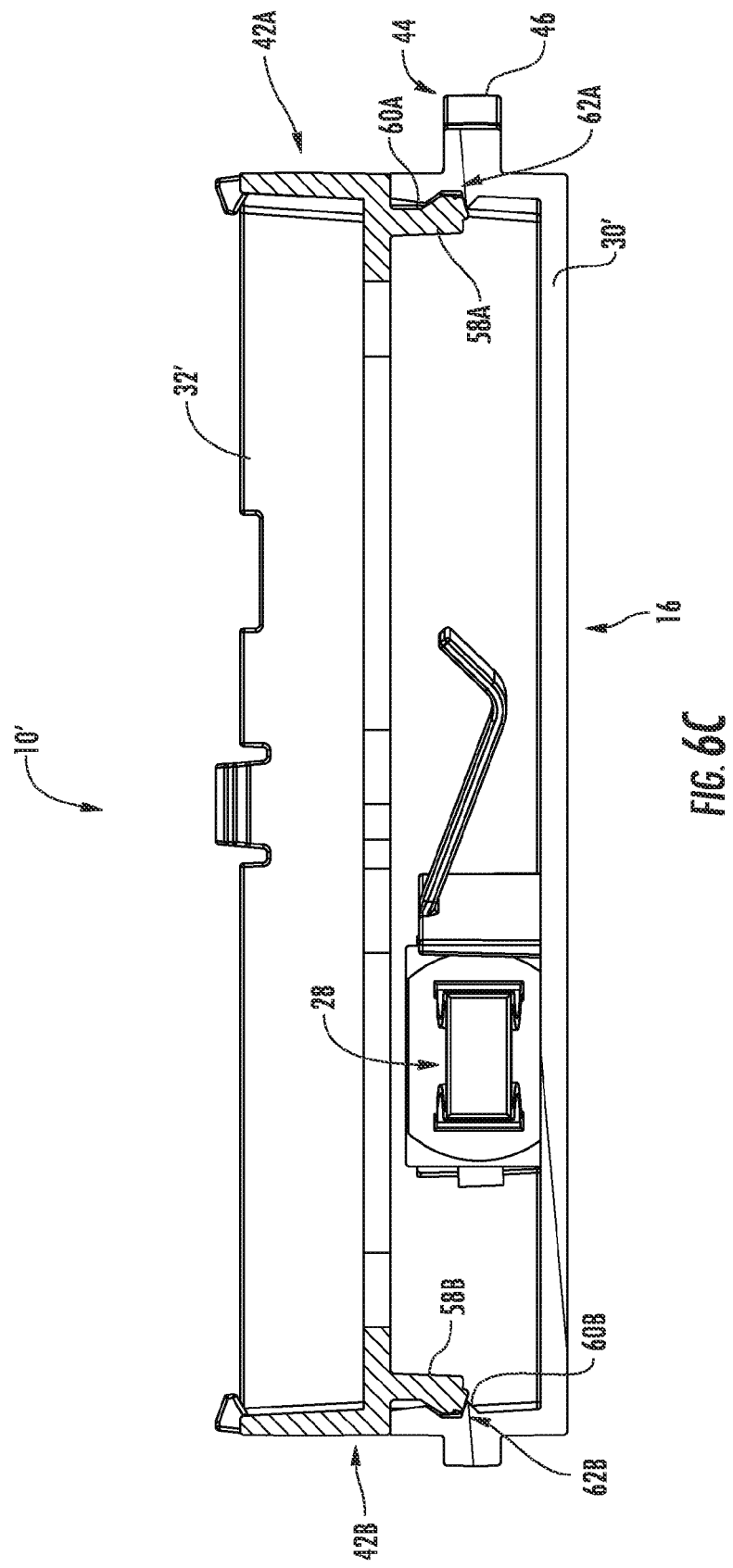

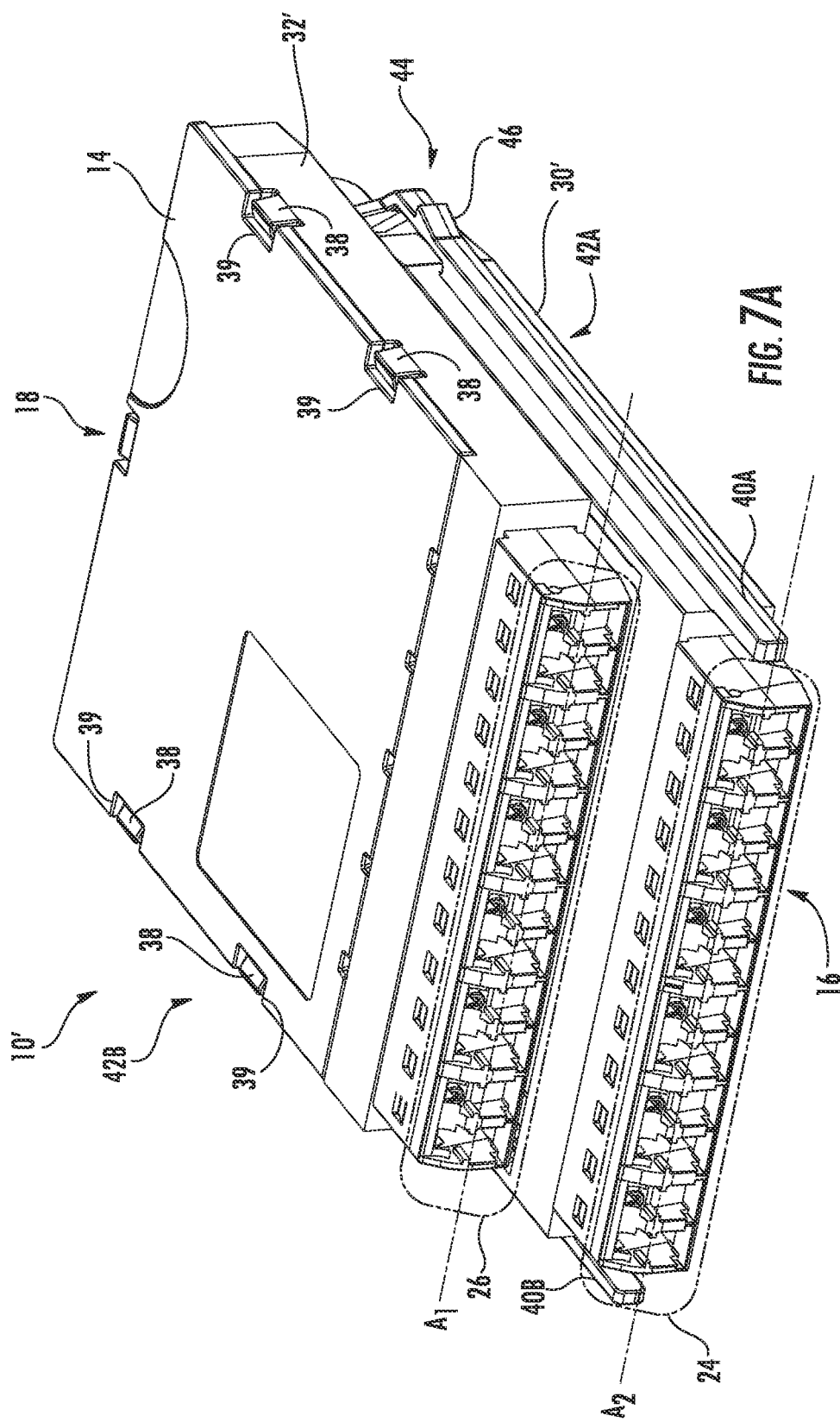

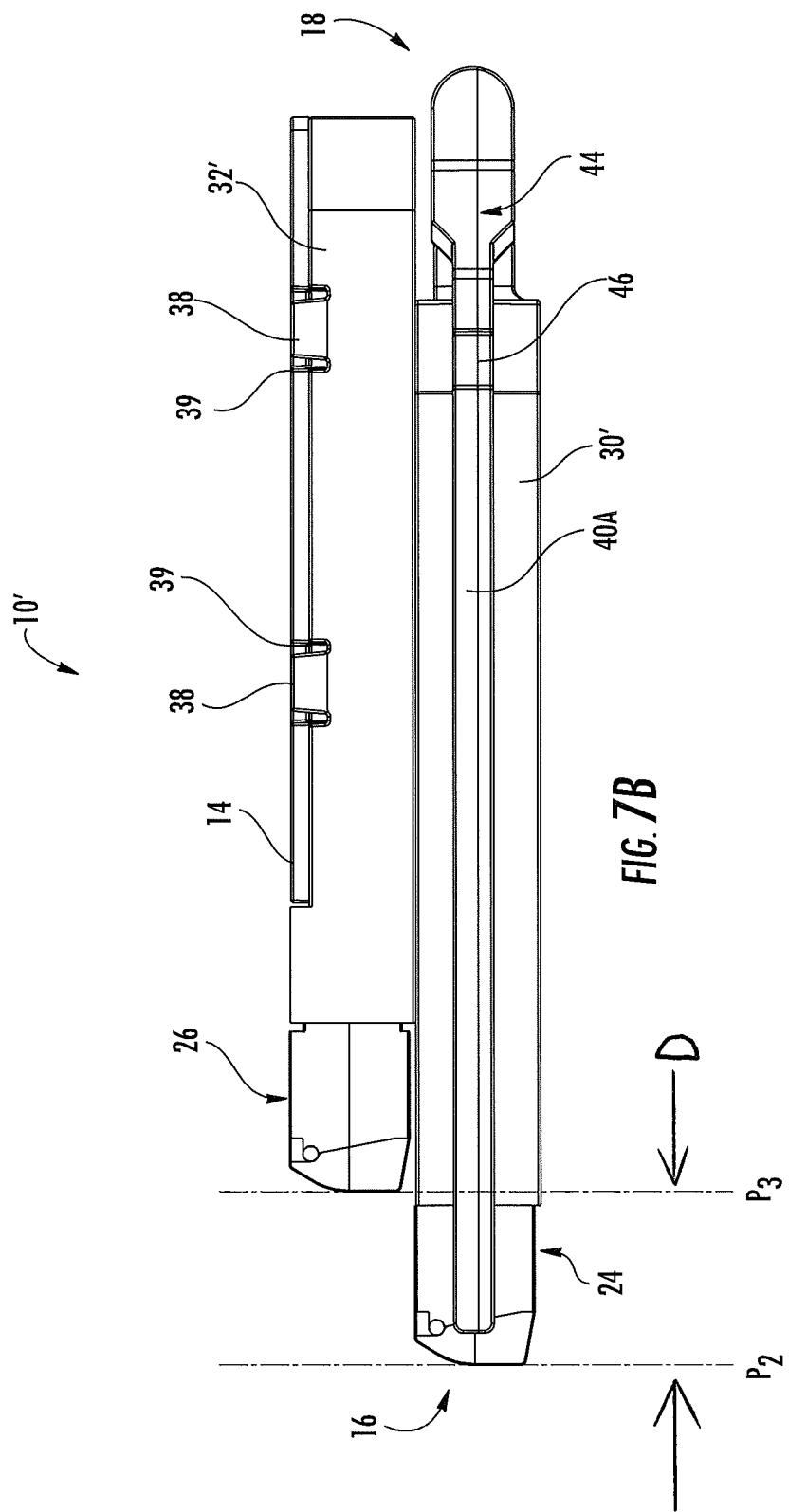

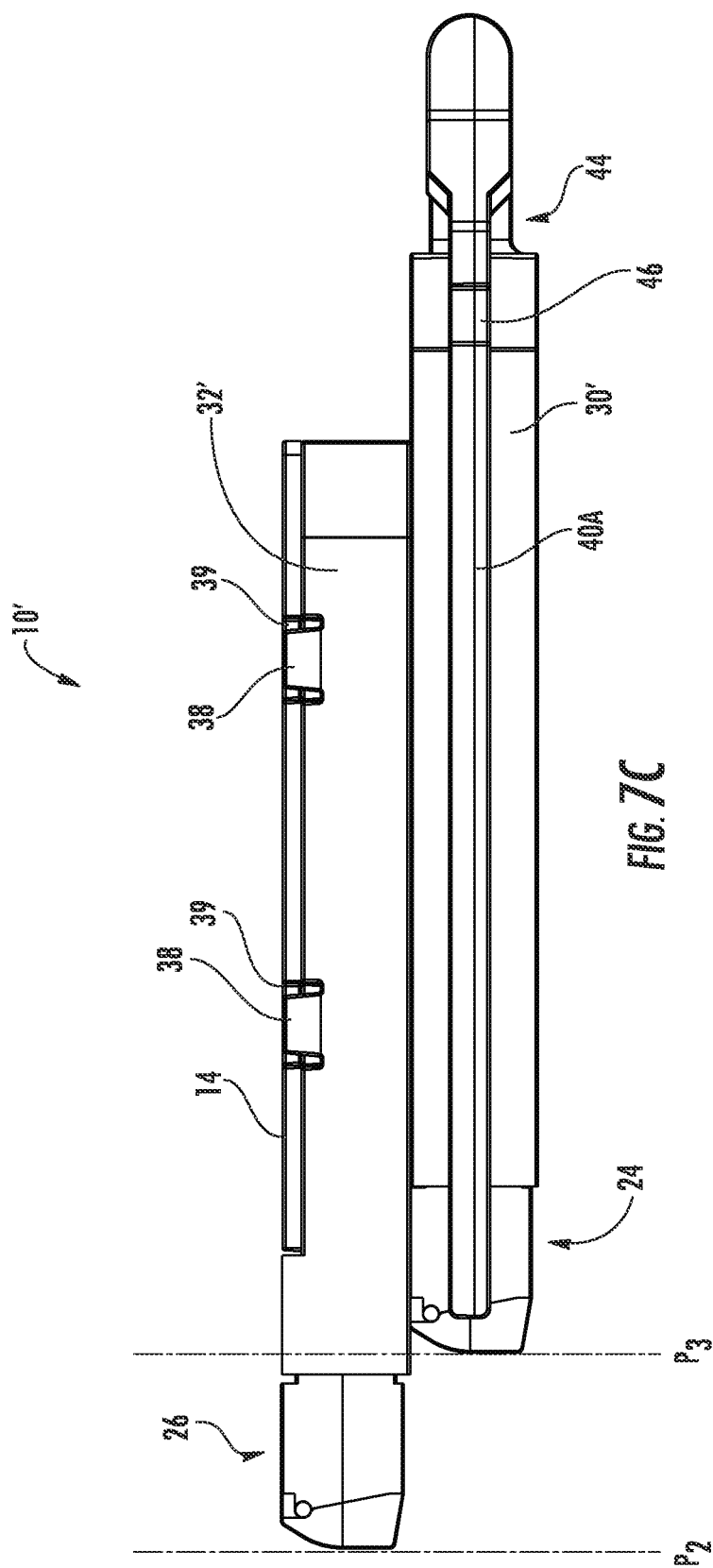

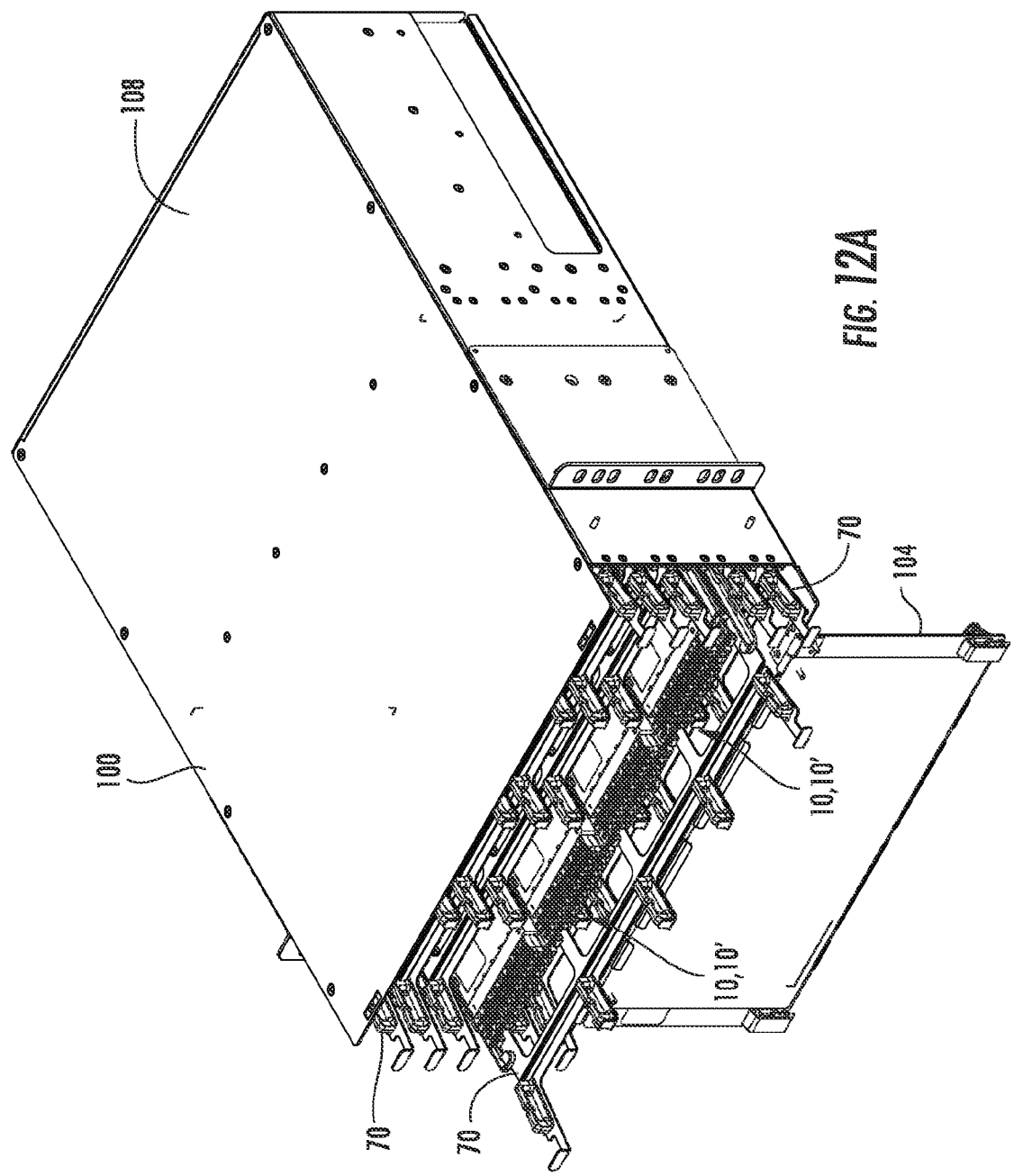

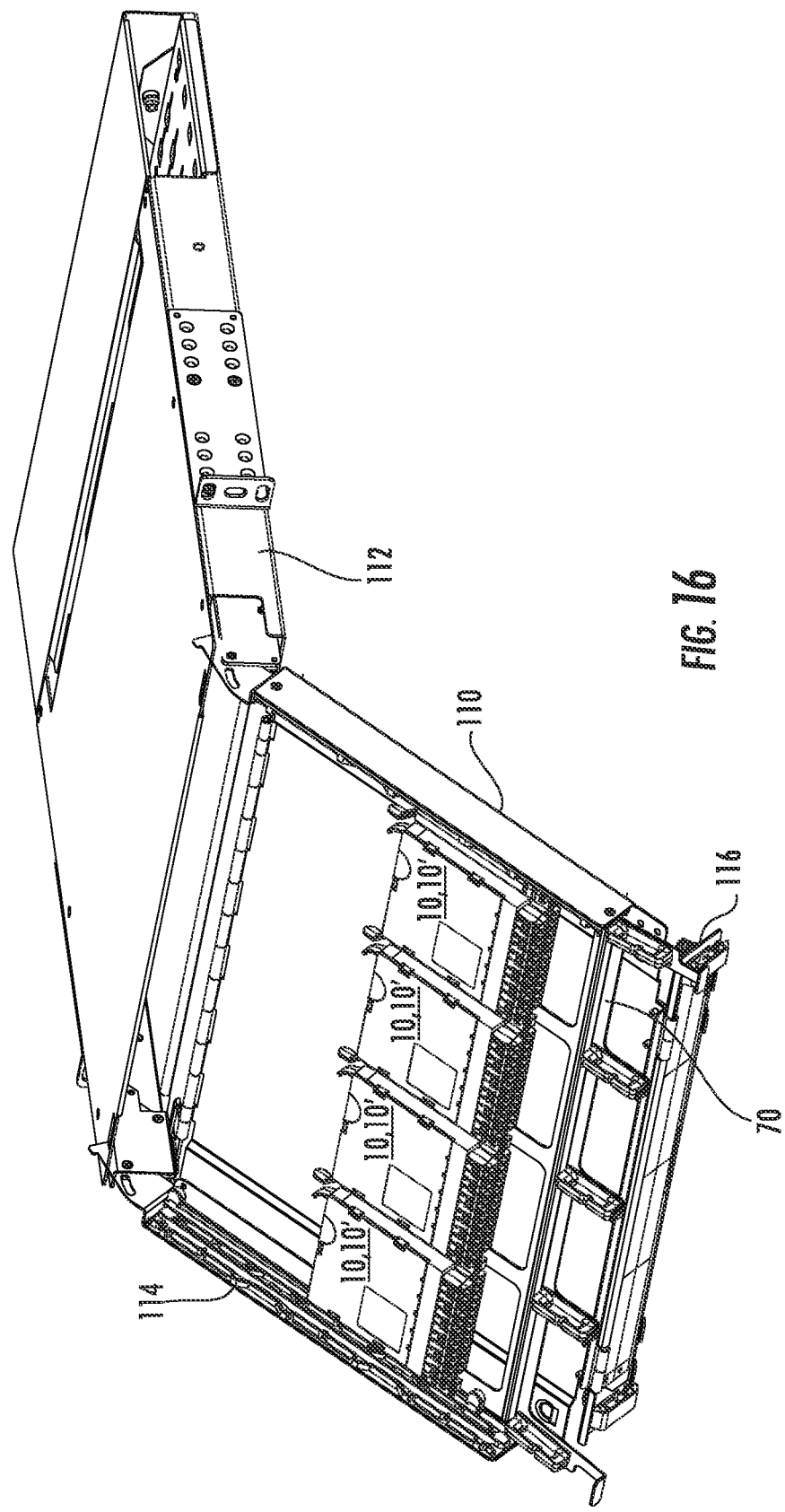

STACKED FIBER OPTIC MODULES AND FIBER OPTIC EQUIPMENT CONFIGURED TO SUPPORT STACKED FIBER OPTIC MODULES

RELATED APPLICATIONS

The present application claims priority to U.S. Provisional Patent Application Ser. No. 61/408,196 filed Oct. 29, 2010, entitled "Stacked Fiber Optic Modules and Fiber Optic Equipment Configured to Support Stacked Fiber Optic Modules," the disclosure of which is relied upon and incorporated herein by reference in its entirety.

BACKGROUND

1. Field of the Disclosure

The technology of the disclosure relates to fiber optic modules and related fiber optic equipment to support and manage fiber optic connections.

2. Technical Background

Benefits of optical fiber include extremely wide bandwidth and low noise transmission. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point. In this regard, fiber optic connection equipment, which is also referred to as fiber optic equipment, is located in data distribution centers or central offices to support interconnections.

The fiber optic equipment is customized based on application need. The fiber optic equipment is typically included in housings that are mounted in equipment racks for organizational purposes and to optimize use of space. One example of such fiber optic equipment is a fiber optic module. A fiber optic module is designed to provide cable-to-cable fiber optic connections and manage the polarity of fiber optic cable connections. A fiber optic module is typically mounted to a chassis or housing which is then mounted inside an equipment rack or cabinet. A technician establishes fiber optic connections to the fiber optic modules mounted in the equipment rack. Due to increasing bandwidth needs and the need to provide a larger number of connections in data centers for increased revenue generating opportunities, a need exists to provide fiber optic modules that can facilitate larger numbers of fiber optic connections in a given space.

SUMMARY OF THE DETAILED DESCRIPTION

Embodiments disclosed in the detailed description include stacked fiber optic modules and fiber optic equipment supporting stacked fiber optic modules. In one embodiment, a stacked fiber optic module is provided. This embodiment of the stacked fiber optic module comprises a body having at least one front side and at least one rear side and defining at least one internal chamber disposed between the at least one front side and the at least one rear side. The stacked fiber optic module further comprises a first plurality of fiber optic components disposed in a first longitudinal axis in the at least one front side. The stacked fiber optic module also further comprises a second plurality of fiber optic components disposed adjacent the first plurality of fiber optic components in a second longitudinal axis parallel or substantially parallel to the first longitudinal axis in the at least one front side. Fiber optic equipment supporting stacked fiber optic modules can include, without limitation, fiber optic equipment trays, housings, chassis, and drawers.

Additional features and advantages will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIGS. 3A and 3B are rear right perspective and side views, respectively, of the exemplary stacked fiber optic module of FIG. 1;

FIG. 3C is a rear view of the exemplary stacked fiber optic module of FIG. 1;

FIGS. 5A and 5B are bottom perspective and front views, respectively, of the top sub-body of the alternative exemplary stacked fiber optic module of FIG. 4;

FIGS. 6A and 6B are side perspective views of the alternative exemplary stacked fiber optic module of FIG. 4 prior to and after the top sub-body being attached to the bottom sub-body, respectively;

FIG. 6C is a front cross-sectional view the alternative exemplary stacked fiber optic module of FIG. 4 with the top sub-body attached to the bottom sub-body;

FIGS. 7A-7C are front right perspective and side views, respectively, of the exemplary alternative stacked fiber optic module of FIG. 4;

FIGS. 12A and 12B are front perspective views of an alternate exemplary 4-U size chassis that can support the fiber optic equipment trays and stacked fiber optic modules according to the fiber optic equipment tray and fiber optic modules disclosed;

FIG. 16 is a front perspective view of the fiber optic equipment drawer of FIG. 14 fully pulled out from the chassis and tilted downward.

DETAILED DESCRIPTION OF THE EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Embodiments disclosed in the detailed description include stacked fiber optic modules and fiber optic equipment supporting stacked fiber optic modules. In one embodiment, a stacked fiber optic module is provided. This embodiment of the stacked fiber optic module comprises a body having at least one front side and at least one rear side and defining at least one internal chamber disposed between the at least one front side and the at least one rear side. The stacked fiber optic module further comprises a first plurality of fiber optic components disposed in a first longitudinal axis in the at least one front side. The stacked fiber optic module also further comprises a second plurality of fiber optic components disposed adjacent the first plurality of fiber optic components in a second longitudinal axis parallel or substantially parallel to the first longitudinal axis in the at least one front side. Fiber optic equipment supporting stacked fiber optic modules can include, without limitation, fiber optic equipment trays, housings, chassis, and drawers.

Figure 1:
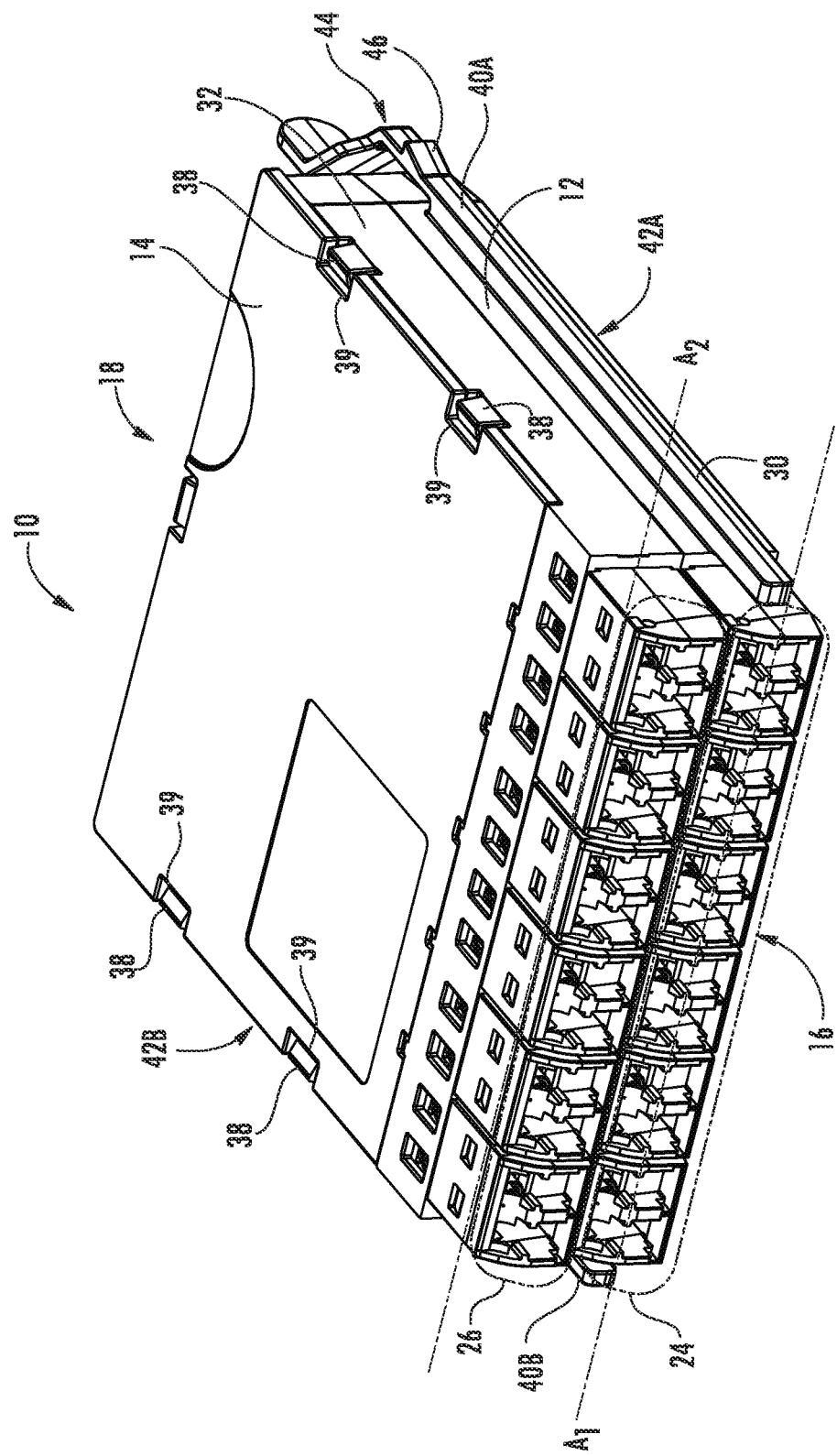
FIG. 1 is a front left perspective view of an exemplary stacked fiber optic module.
Figure 2:
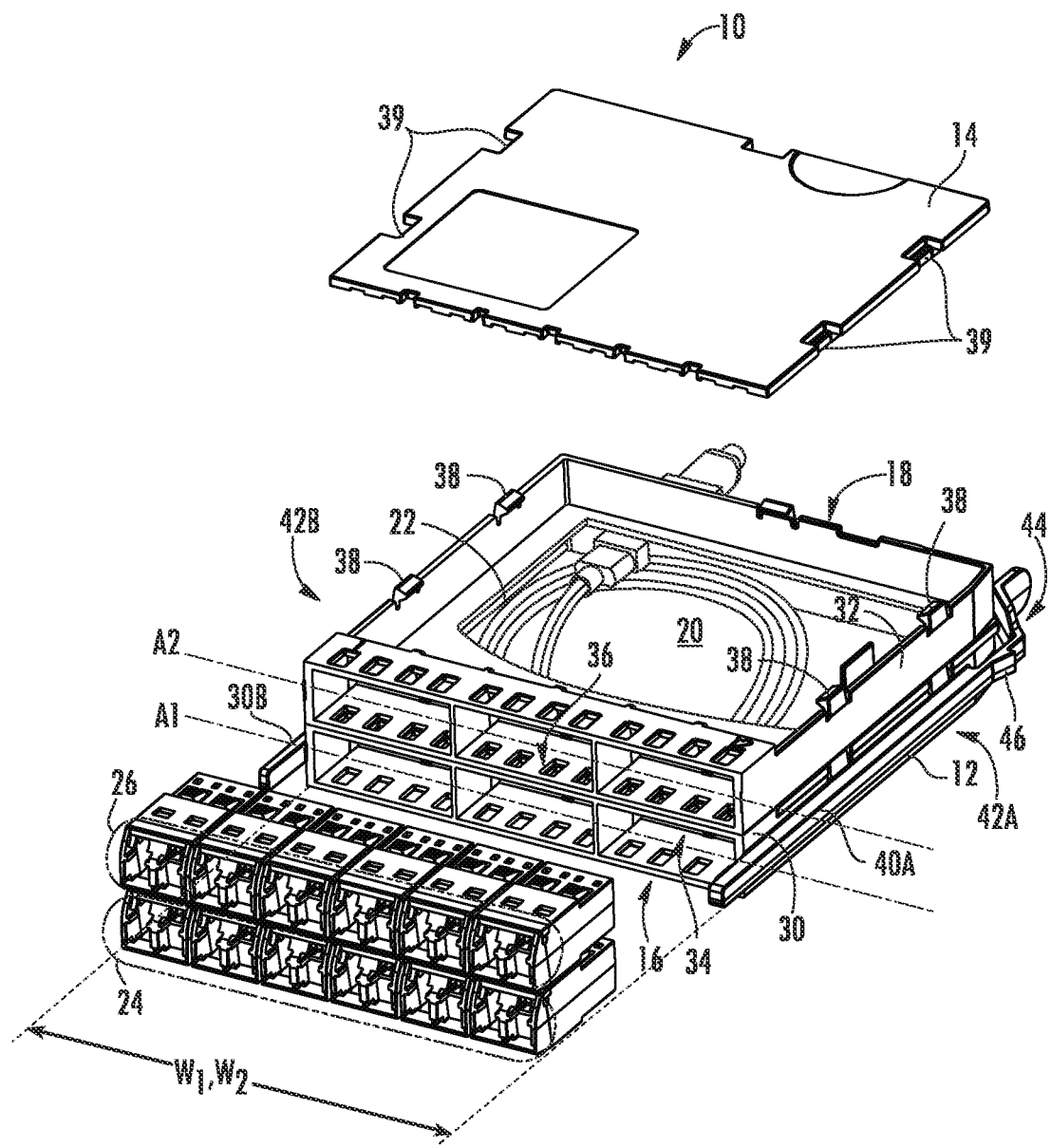
FIG. 2 is a perspective, exploded view of the exemplary stacked fiber optic module in FIG. 1.

In this regard, FIG. 1 is a front left perspective view of an exemplary stacked fiber optic module 10. FIG. 2 illustrates a perspective, exploded view of the stacked fiber optic module 10 in FIG. 1. As illustrated in FIGS. 1 and 2, the stacked fiber optic module 10 is comprised of a body 12 receiving a cover 14. The body 12 has a front side 16 and a rear side 18 and defines an internal chamber 20 (FIG. 2) disposed between the front side 16 and rear side 18. The internal chamber 20 is configured to receive or retain optical fibers or a fiber optic cable harness 22 (FIG. 2) for establishing connections and maintaining desired polarity for first and second pluralities of fiber optic components 24, 26. The first plurality of fiber optic components 24 is disposed in a first longitudinal axis $A_1$ in the front side 16 of the body 12. The second plurality of fiber optic components 26 is disposed adjacent the first plurality of fiber optic components 24 in a second longitudinal axis $A_2$ parallel or substantially parallel to the first longitudinal axis $A_1$ in the front side 16. In this manner, the stacked fiber optic module 10 is configured to support a great number and/or density of fiber optic components in a given body 12 size or space. The stacked fiber optic module 10 may be employed in high-density fiber optic connection applications.

In this example, the first and second pluralities of fiber optic components 24, 26 are duplex LC fiber optic adapters that are configured to receive and support connections with duplex LC fiber optic connectors. However, any fiber optic connection type desired can be provided in the fiber optic module 10. As illustrated in FIG. 3A, the first and second pluralities of fiber optic components 24, 26 are connected to a fiber optic component 28 disposed through the rear side 18 of the body 12. In this manner, a connection to the first and second pluralities of fiber optic components 24, 26 creates a fiber optic connection to the fiber optic component 28. In this example, the fiber optic component 28 is a multi-fiber MPO fiber optic adapter equipped to establish connections to multiple optical fibers (e.g., either twelve (12) or twenty-four (24) optical fibers). For example, if the first and second pluralities of fiber optic components 24, 26 provide twenty-four (24) connections, the fiber optic component 28 may be a twenty-four (24) optical fiber MPO fiber optic adapter to support the connections being provided to a fiber optic cable connected to the MPO fiber optic adapter.

In this example as illustrated in FIGS. 1 and 2, to provide for both the first and second pluralities of fiber optic components 24, 26 to be supported by the stacked fiber optic module 10, the body 12 is comprised of two sub-bodies. A first or bottom sub-body 30 supports the first plurality of fiber optic components 24, and a second or top sub-body 32 supports the second plurality of fiber optic components 26. The second sub-body 32 is disposed or "stacked" on top or adjacent to the first sub-body 30 in this example. The first and second sub-bodies 30, 32 may be provided as part of a single mold for the body 12. Alternatively, as will be discussed by example below with regard to FIGS. 4-7C, the first and second sub-bodies 30, 32 may be cast from two separate molds, wherein the first and second sub-bodies 30, 32 are secured to each other either permanently or in a removable manner.

Figure 3B:
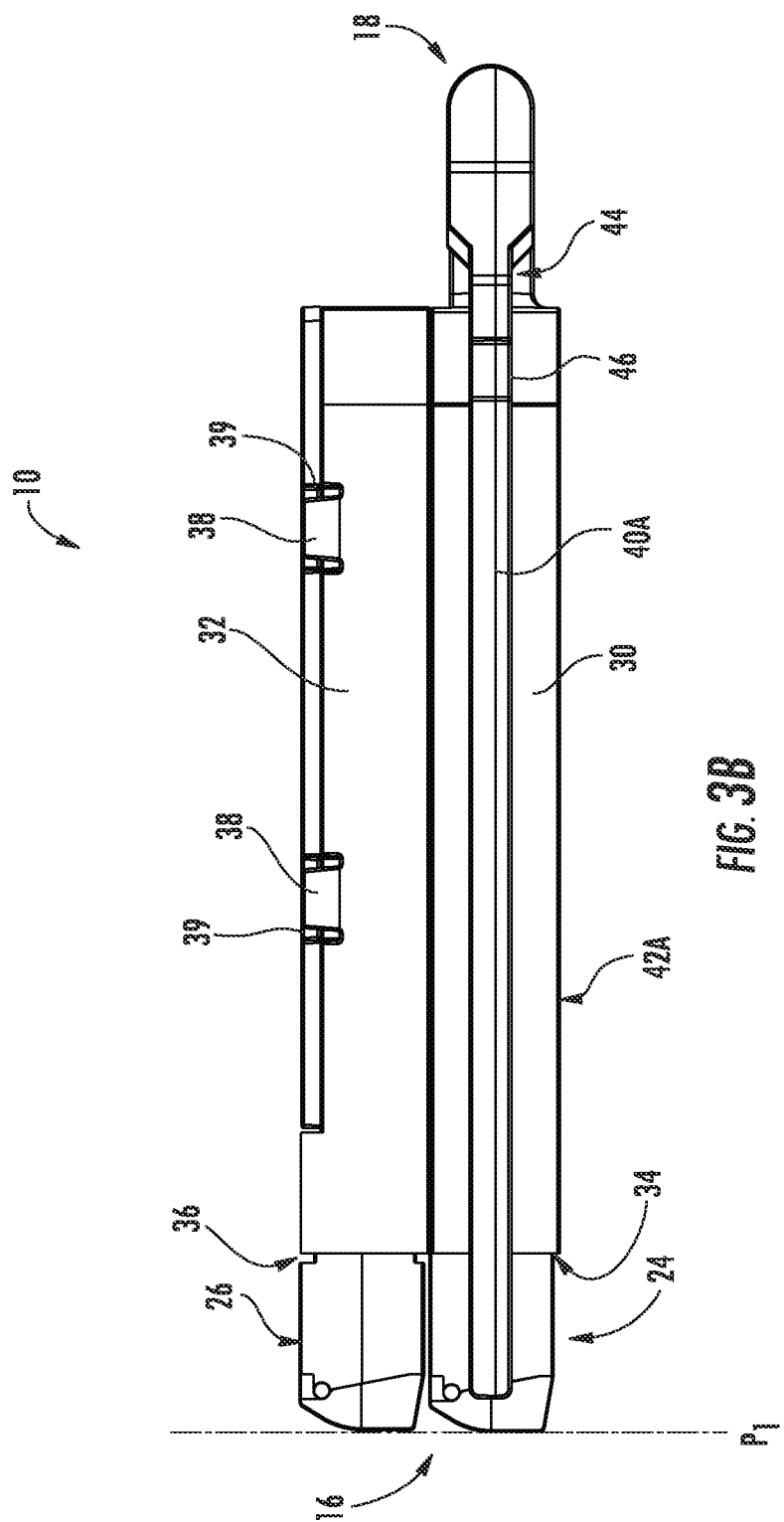

With reference back to FIG. 2, the stacked fiber optic module 10 provides that the first plurality of fiber optic components 24 is disposed in the first sub-body 30 in a first front opening 34 disposed in the first longitudinal axis $A_1$ in the front side 16 of the body 12. Similarly, the second plurality of fiber optic components 26 is disposed in the second sub-body 32 in a second front opening 36 disposed in the second longitudinal axis $A_2$ in the front side 16 of the body 12. In this example of the stacked fiber optic module 10, as illustrated in FIG. 3B, the first front opening 34 is disposed in the same plane or substantially the same plane as the second front opening 36. This arrangement provides that the first plurality of fiber optic components 24 is disposed in the same front plane or substantially the same front plane $P_1$ as the second plurality of fiber optic components 26. As will be discussed in more detail below, other options are possible wherein a stacked fiber optic module is provided that supports a first plurality of fiber optic components disposed in a different plane from a second plurality of fiber optic components.

With continuing reference to FIG. 2, in this example of the stacked fiber optic module 10, the cover 14 is configured to engage with the second sub-body 32. In this regard, tabs 38 are disposed in the second sub-body 32 and configured to engage with complementary detents 39 disposed on the cover 14 to secure the cover 14 to the second sub-body 32 when engaged thereto.

With continuing reference to FIGS. 1-3B, module rails 40A, 40B are disposed on each side 42A, 42B of the stacked fiber optic module 10. In this example, the module rails 40A, 40B are disposed on each side 42A, 42B of the first sub-body 30. As will be discussed in more detail below, the module rails 40A, 40B are configured to be inserted within the module rail guides (not shown) in the fiber optic equipment to support the stacked fiber optic module 10. In this manner, when it is desired to install the stacked fiber optic module 10 in the fiber optic equipment, either the front side 14 or the rear side 16 of the stacked fiber optic module 10 can be first inserted into the module rail guides of a fiber optic equipment tray to dispose the module rails 40A, 40B in the module rail guides. A latch 44 containing a protrusion 46 is shown as being attached to the module rail 40A to allow the module rail 40A to be secured within a module rail guide.

The stacked fiber optic module 10 may also be configured to provide a certain density of fiber optic connections. In this regard, the stacked fiber optic module 10 may be provided of certain dimensions. For example, the stacked fiber optic module 10 may be provided wherein the first plurality of fiber optic components 24 is comprised of at least twelve (12) fiber optic connections disposed in a width $W_1$ (FIG. 2) of the first front opening 34 of ninety (90) mm or less. Further, the stacked fiber optic module 10 may be provided wherein the second plurality of fiber optic components 26 is also comprised of at least twelve (12) fiber optic connections disposed in a width $W_2$ (FIG. 2) of the second front opening 36 of ninety (90) mm or less. As another example, the first front opening 34 may be configured to support a fiber optic connection density of at least one fiber optic connection per 7.0 mm of width $W_1$ of the first front opening 34. Likewise, the second front opening 36 may be configured to support a fiber optic connection density of at least one fiber optic connection per 7.0 mm of width $W_2$ of the second front opening 36.

As discussed above, the first sub-body of a stacked fiber optic module may be provided as a separate component from a second sub-body of a stacked fiber optic module. The first sub-body and second sub-body may be configured to be permanently attached or be removeably attached. In this regard, FIGS. 4-7C discussed below provide an alternative exemplary stacked fiber optic module 10' wherein a first sub-body 30' is a separate component from the second sub-body 32' when disassembled and secured to each other when assembled. As will be discussed in more detail below, providing the first sub-body 30' as a separate component from the second sub-body 32' allows the first sub-body 30' to be slid about the second sub-body 32' to provide improved finger access to the fiber optic components 24, 26.

Figure 4:
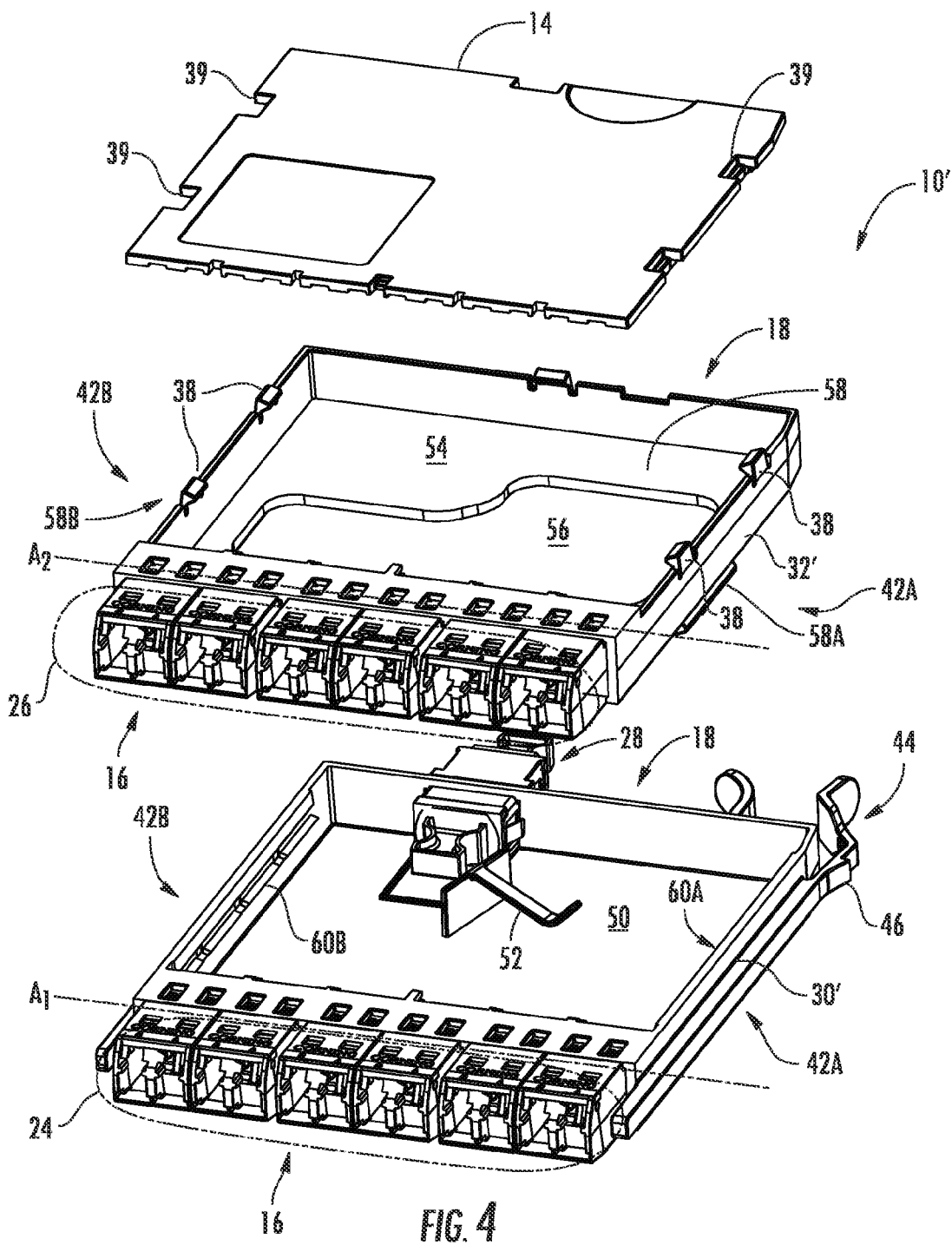
FIG. 4 is a perspective, exploded view of an alternative exemplary stacked fiber optic module having removable and/or sliding sub-bodies.
Figure 6B:
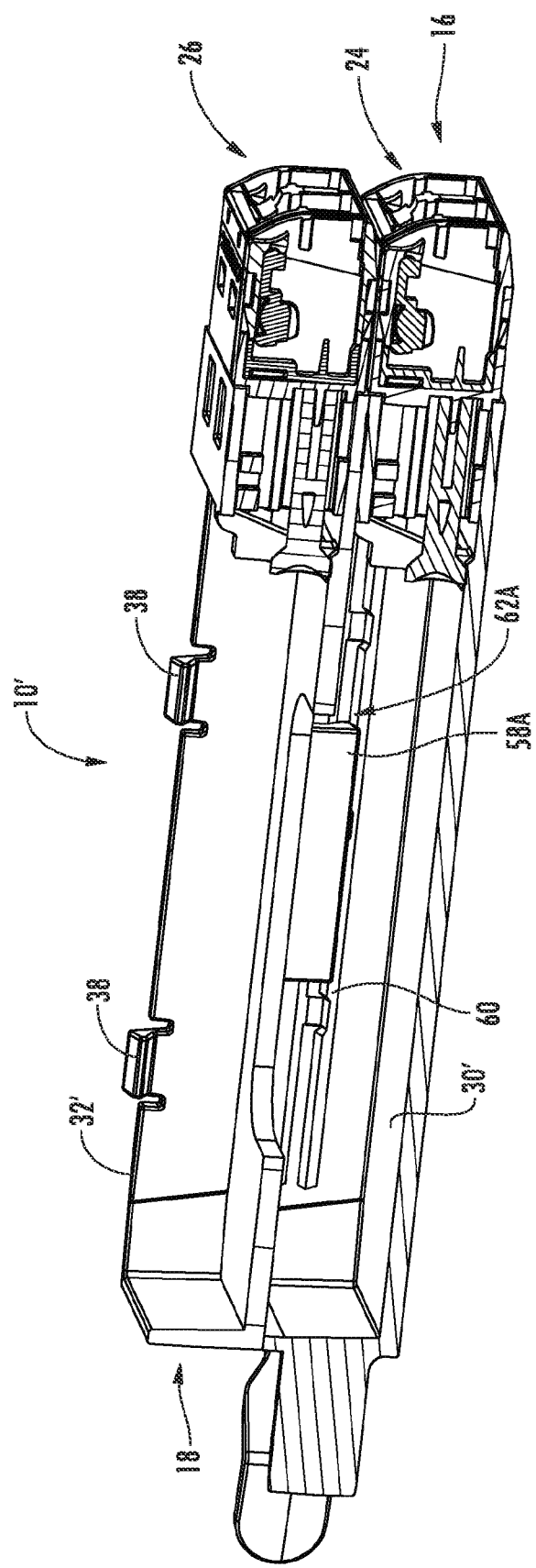

In this regard, FIG. 4 is a perspective, exploded view of the stacked fiber optic module 10' having the separate first sub-body 30' and second sub-body 32'. Other components provided in the stacked fiber optic module 10' that are common and/or provided in the stacked fiber optic module 10 in FIGS. 1-3C are shown in FIG. 4 with common element numbers and thus will not be described again. As illustrated in FIG. 4, the first sub-body 30' includes an internal chamber 50 that is configured to receive the fiber optic component 28 disposed through the rear side 18 of the body 12 and to store a cable harness connecting the fiber optic component 28 to the fiber optic components 24 and/or 26. A fiber guide 52 is disposed in the first sub-body 30' inside the internal chamber 50 to guide optical fibers from a cable harness. An internal chamber 54 is also disposed in the second sub-body 32'. To allow optical fibers from a cable harness connected to the fiber optic component 28 to be internally routed to the fiber optic connectors 24, 26 in both the first sub-body 30' and second sub-body 32', an opening 56 is disposed in a base 58 of the second sub-body 32'. The opening 56 connects the internal chambers 50, 54 when the second sub-body 32' is installed on the first sub-body 30'.

Features are also provided in the first sub-body 30' and the second sub-body 32' to allow the first sub-body 30' and the second sub-body 32' to be easily connected together to form the stacked fiber optic module 10'. In this regard, as illustrated in FIG. 4 and the bottom and front views of the second sub-body 32' in FIGS. 5 and 6, respectively, the second sub-body 32' contains locking tabs 58A, 58B disposed on each side 42A, 42B. The locking tabs 58A, 58B are configured to engage with rails 60A, 60B, respectively, disposed inside the first sub-body 30'. As illustrated in FIG. 5B and the side cross-sectional view of the stacked fiber optic module 10' in FIG. 6A, the locking tabs 58A, 58B contain outwardly flared portions 62A, 62B. As illustrated in the side cross-sectional view of the stacked fiber optic module 10' in FIG. 6B, the outwardly flared portions 62A, 62B of the locking tabs 58A, 58B, respectively, are configured to interfere with and be pushed out from the rails 60A, 60B when the second sub-body 32' is alignedly disposed on top of the first sub-body 30' and the second sub-body 32' is pushed down on the first sub-body 30'. The outwardly flared portions 62A, 62B of the locking tabs 58A, 58B then move inwardly in a locking position when disposed below the rails 60A, 60B, as illustrated in the front cross-sectional view of the stacked fiber optic module 10' in FIG. 6C.

Providing the rails 60A, 60B in the first sub-body 30' to interlock the second sub-body 32' to the first sub-body 30' also allows the second sub-body 32' to be translated about the first sub-body 30' for improved access to the fiber optic components 24, 26, as illustrated in FIGS. 7A-7C. The locking tabs 58A, 58B can translate about the rails 60A, 60B to allow the second sub-body 32' to be translated about the first sub-body 30' in the depth direction, as illustrated in FIGS. 7A-7C.

In this regard, FIGS. 7A-7C illustrate front right perspective and side views, respectively, of the stacked fiber optic module 10'. As illustrated in FIG. 7B, the first plurality of fiber optic components 24 is disposed in a different front plane from the second plurality of fiber optic components 26 when the second sub-body 32' is translated back about the first sub-body 30'. In this regard, the first plurality of fiber optic components 24 is disposed in a front plane $P_2$, which is disposed forward of a front plane $P_3$ where the second plurality of fiber optic components 26 is disposed. This may improve finger access to the first plurality of fiber optic components 24 by providing the first plurality of fiber optic components 24 in a different front plane from the second plurality of fiber optic components 26. This is because the first plurality of fiber optic components 24 is disposed forward of the second plurality of fiber optic components 26, such that the second plurality of fiber optic components 26 does not intrude access to the first plurality of fiber optic components 24, and vice versa. By way of example, a distance D that front plane $P_2$ extends beyond front plane $P_3$ is about 10 millimeters or more or vice versa as discussed below.

FIG. 7C is a side view of the stacked fiber optic module 10' where the second sub-body 32' is disposed forward of the first sub-body 30', to provide improved finger access to the second plurality of fiber optic components 26. As illustrated in FIG. 7C, the first plurality of fiber optic components 24 is disposed in a different front plane from the second plurality of fiber optic components 26 in the stacked fiber optic module 10' in FIGS. 7A and 7B. The first plurality of fiber optic components 24 is disposed in the front plane $P_3$, which is disposed behind the front plane $P_2$ where the second plurality of fiber optic components 26 is disposed. This may improve finger access to the first plurality of fiber optic components 24 and second plurality of fiber optic components 26. Because the first plurality of fiber optic components 24 is disposed behind the second plurality of fiber optic components 26, the first plurality of fiber optic components 24 does not intrude access to the second plurality of fiber optic components 26, and vice versa.

Figure 8:
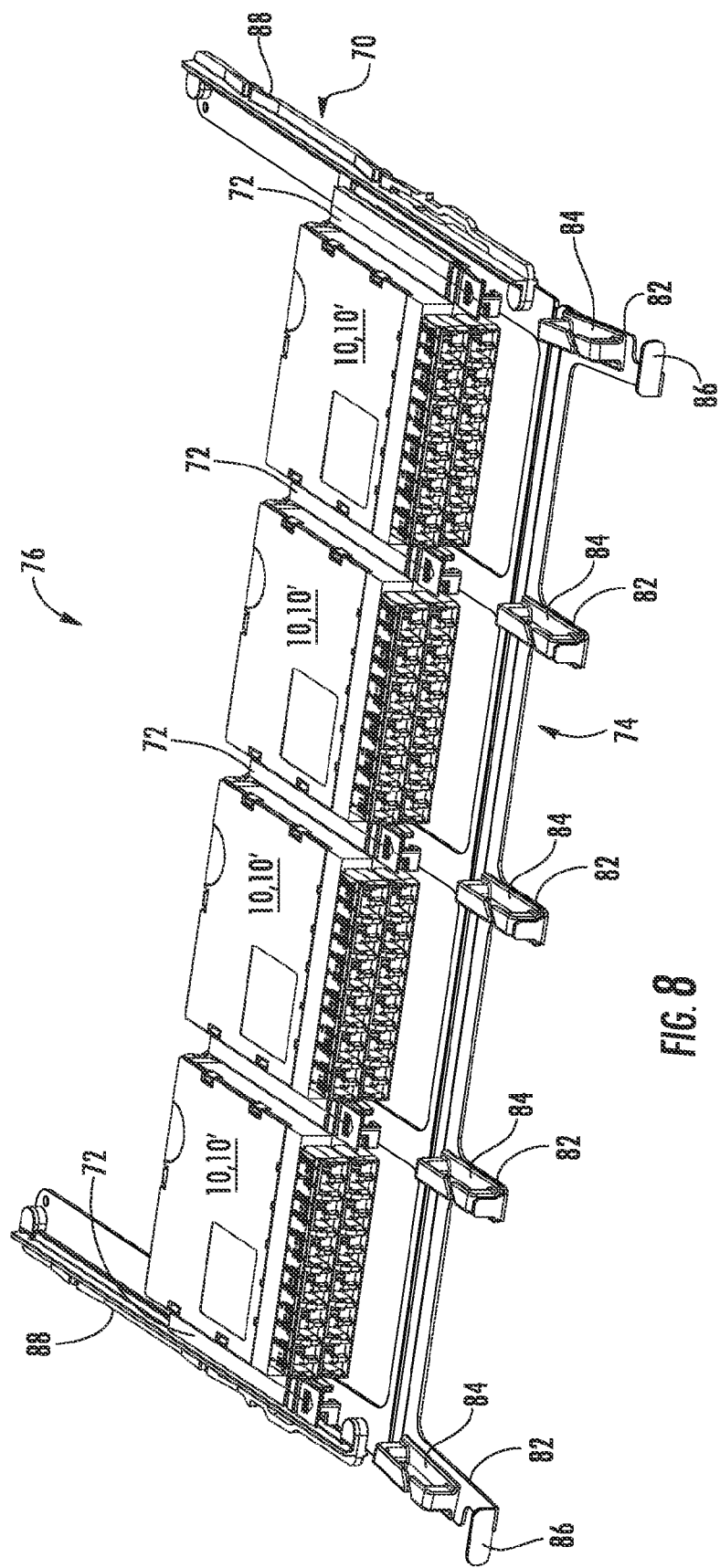
FIG. 8 is a front perspective view of one fiber optic equipment tray with installed stacked fiber optic modules configured to be installed in a chassis.

The stacked fiber optic modules 10, 10' can be configured to be disposed in a variety of different types of fiber optic equipment. For example, FIG. 8 is a front perspective view of a fiber optic equipment tray 70 supporting installed stacked fiber optic modules 10, 10' therein. The module rails 40A, 40B (FIGS. 1-7C) of the stacked fiber optic modules 10, 10' are inserted in module rail guides 72 disposed in the fiber optic equipment tray 70. Each module rail guide 72 includes a guide 73 to receive the module rails 40A, 40B, as illustrated in the unloaded fiber optic equipment tray 70 in FIG. 10. Note that any number of module rail guides 72 can be provided. The stacked fiber optic modules 10, 10' can be installed from both a front end 74 and a rear end 74 of the fiber optic equipment tray 70 in this embodiment. The stacked fiber optic modules 10, 10' can then be pushed within the module rail guides 72.

Figure 10:
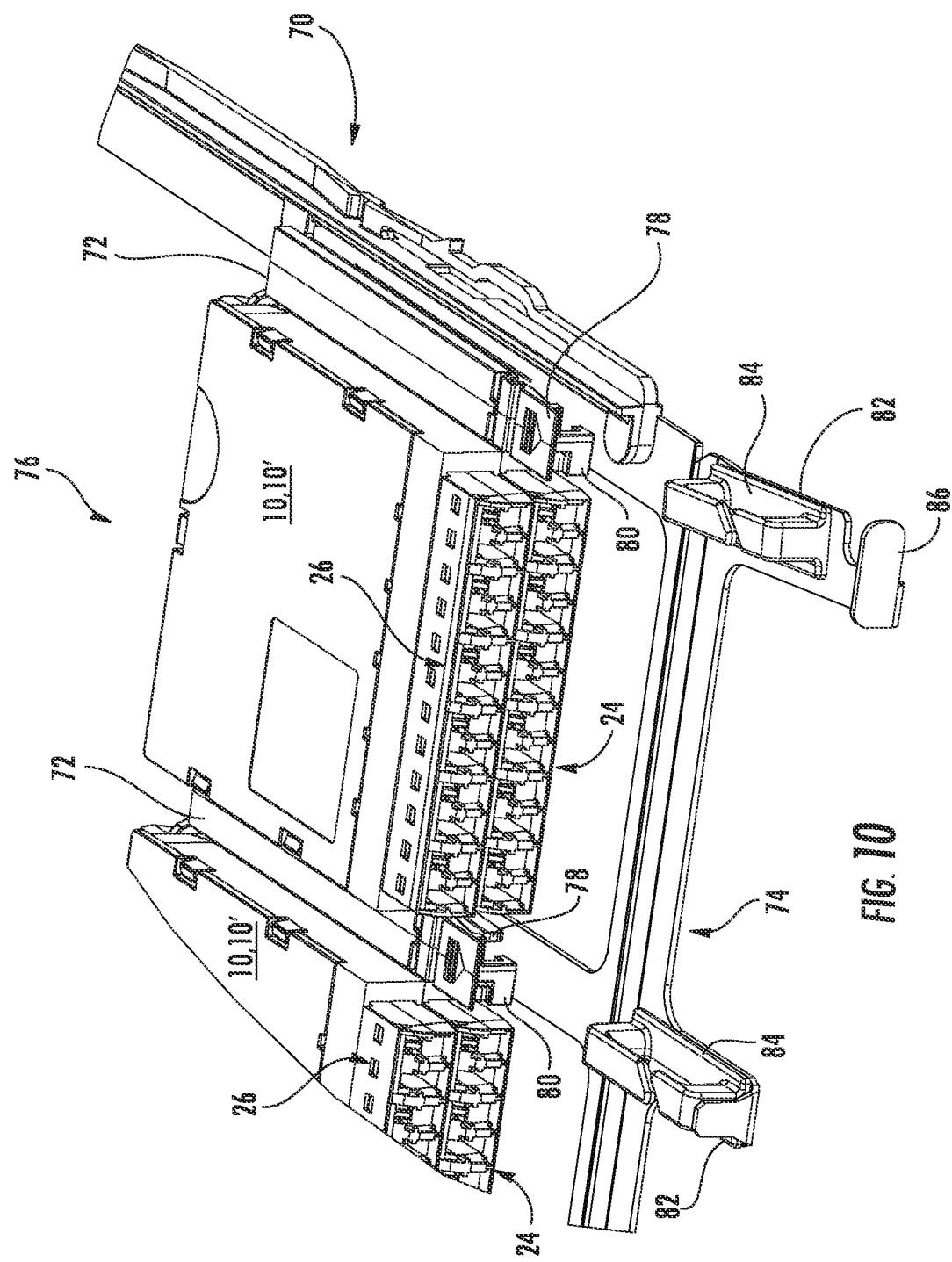
FIG. 10 is a close-up view of the fiber optic equipment tray of FIG. 8 with fiber optic modules installed therein.

The stacked fiber optic modules 10, 10' can be moved towards the front end 74 until the stacked fiber optic modules 10, 10' reach a locking feature 78 disposed in the front end 34, as illustrated in the close-up view of the fiber optic equipment tray 70 in FIG. 10. The locking features 78 each include a stop 80. The stop 80 prevents the stacked fiber optic modules 10, 10' from extending beyond the front end 74. When it is desired to remove a stacked fiber optic module 10, 10' from the fiber optic equipment tray 70, the locking feature 78 can be engaged wherein the stop 80 will move downward away from the stacked fiber optic module 10, 10' such that the stacked fiber optic module 10, 10' is not obstructed from being pulled forward. The stacked fiber optic module 10, 10', and in particular its module rails 40A, 40B (FIGS. 1-7C), can be pulled forward along the module rail guides 72 to remove the stacked fiber optic module 10, 10' from the fiber optic equipment tray 70.

The stacked fiber optic module 10, 10' can also be removed from the rear end 76 of the fiber optic equipment tray 70. To remove the stacked fiber optic module 10, 10' from the rear end 76 of the fiber optic equipment tray 70, the protrusion 46 disposed in the module rails 40A, 40B is disengaged by pushing the latch 44 (FIGS. 1-7C) inward towards the stacked fiber optic module 10, 10' to release the protrusion 46 from the module rail guide 72.

Figure 9:
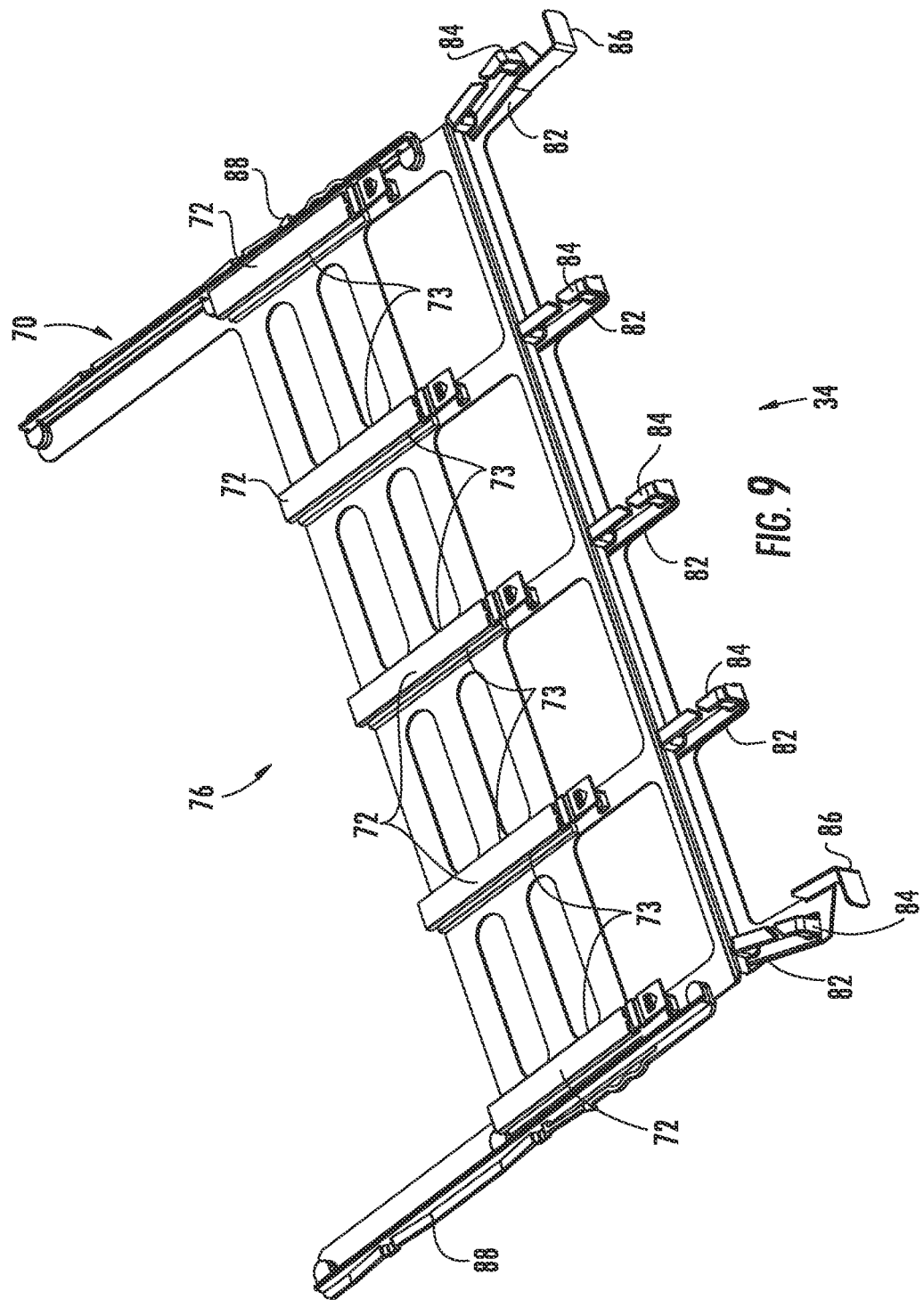
FIG. 9 is a front perspective view of the fiber optic equipment tray of FIG. 8 without stacked fiber optic modules installed therein.

With continuing reference to FIGS. 8-10, the fiber optic equipment tray 70 may also contain extension members 82. Routing guides 84 may be conveniently disposed on the extension members 82 to provide routing for optical fibers or fiber optic cables connected to the first and second pluralities of fiber optic components 24, 26 disposed in the stacked fiber optic modules 10, 10' (FIG. 10). The routing guides 84 on the ends of the fiber optic equipment tray 70 may be angled with respect to the module rail guides 72 to route optical fibers or fiber optic cables at an angle to the sides of the fiber optic equipment tray 70. Pull tabs 86 may also be connected to the extension members 82 to provide a means to allow tray guide rails 88 (FIG. 9) disposed in the fiber optic equipment tray 70 to be easily pulled out from a chassis, as will be described in more detail below.

The fiber optic equipment trays 70 in FIGS. 8-10 that support one or more of the stacked fiber optic modules 10, 10' are configured to be installed in a chassis or other fiber optic equipment. In this regard, FIG. 11 is a front perspective view of an exemplary fiber optic equipment rack 90 with an installed exemplary 1-U size chassis supporting the fiber optic equipment trays 70 of FIGS. 8-10 each supporting stacked fiber optic modules 10, 10'.

Figure 11:
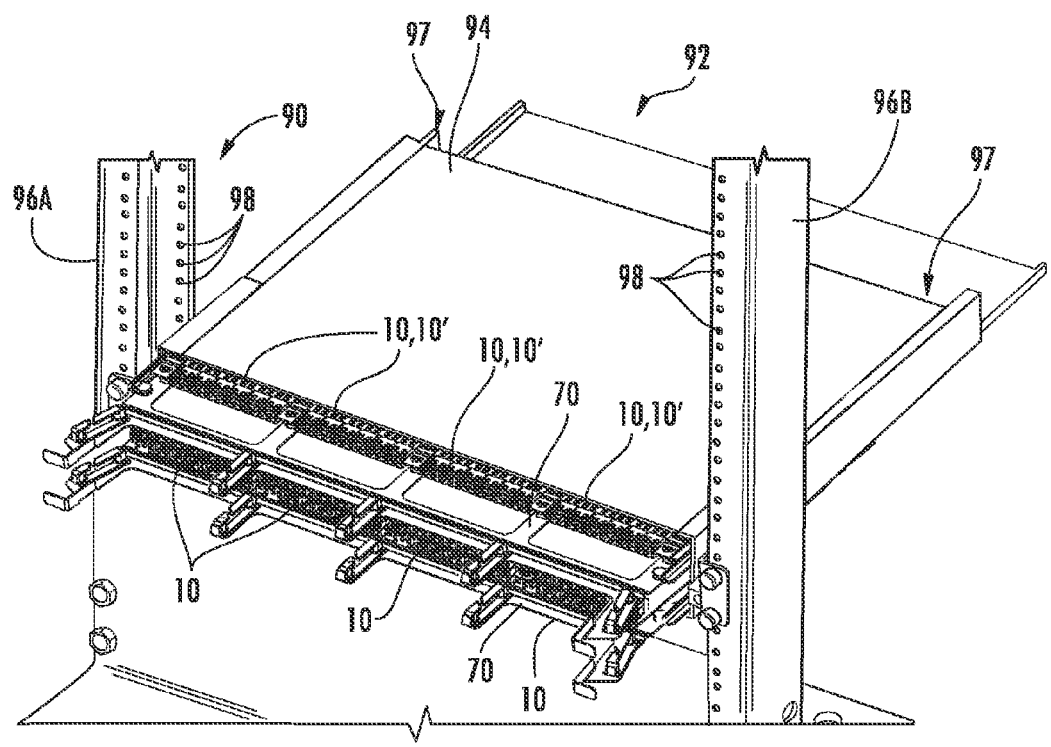
FIG. 11 is a front perspective view of an exemplary fiber optic equipment rack with an installed exemplary 1-U size chassis supporting fiber optic equipment trays of FIG. 6 each supporting stacked fiber optic modules.

In this regard, FIG. 11 illustrates exemplary 1-U or 1-RU size fiber optic equipment 92 from a front perspective view. The fiber optic equipment 92 may be provided at a data distribution center or central office to support cable-to-cable fiber optic connections and to manage a plurality of fiber optic cable connections. As shown in FIG. 11, the fiber optic equipment 92 supports one or more of the fiber optic equipment trays 70 that each support one or more of stacked fiber optic modules 10, 10'. In addition, the fiber optic equipment 92 could also be adapted to support one or more fiber optic patch panels or other fiber optic equipment that supports fiber optic components and connectivity.

With continuing reference to FIG. 11, the fiber optic equipment 92 includes a fiber optic equipment chassis 94 (also referred to herein a "chassis 94"). The chassis 94 is shown as being installed in the fiber optic equipment rack 90. The fiber optic equipment rack 90 contains two vertical rails 96A, 96B that extend vertically and include a series of apertures 98 for facilitating attachment of the chassis 94 inside the fiber optic equipment rack 90. The chassis 94 is attached and supported by the fiber optic equipment rack 90 in the form of shelves that are stacked on top of each other within the vertical rails 96A, 96B. The tray guide rails 88 of the fiber optic equipment trays 70 previously described with regard to FIGS. 8-10 can be inserted into tray rail guides 97 disposed in the chassis 94 to allow each fiber optic equipment tray 70 to be independently extended out from and retracted back into the chassis 94. As illustrated, the chassis 94 is attached to the vertical rails 96A, 96B. The fiber optic equipment rack 90 may support 1-U or 1-RU-sized shelves, with "U" or "RU" equal to a standard 1.75 inches in height and nineteen (19) inches in width. In certain applications, the width of "U" may be twenty-three (23) inches. In this embodiment, the chassis 94 is 1-U in size; however, the chassis 94 could be provided in a size greater than 1-U as well.

Up to three (3) fiber optic equipment trays 70 can be supported by the chassis 94. However, only one of the fiber optic equipment trays 70 provided in the chassis 94 can support stacked fiber optic modules 10, 10' due to the additional space consumed by the stacked fiber optic modules 10, 10'. In this regard, two (2) of such fiber optic equipment trays 70 can be provided in the chassis 94 if stacked fiber optic modules 10, 10' are included. In this scenario, one fiber optic equipment tray 70 supported in the chassis 94 could contain stacked fiber optic modules 10, 10', and the second fiber optic equipment tray 70 could support non-stacked fiber optic modules 10, 10' that have the height of one of the sub-bodies 30, 32 of the stacked fiber optic module 10, 10' (FIGS. 1-7C). The total count of fiber optic connections that can be supported by the chassis 94 is not reduced in any of these configurations.

Figure 12B:
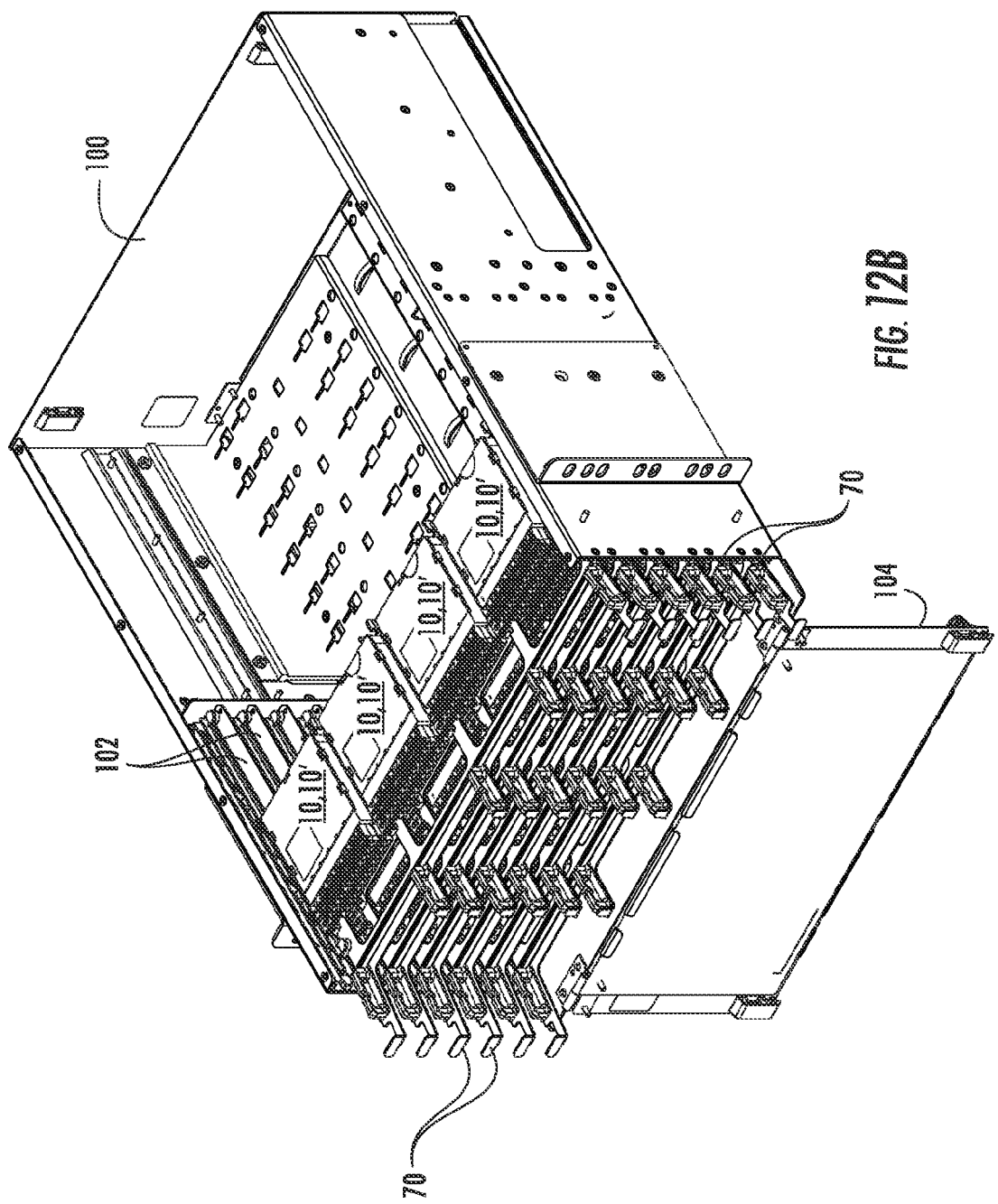
Figure 13:
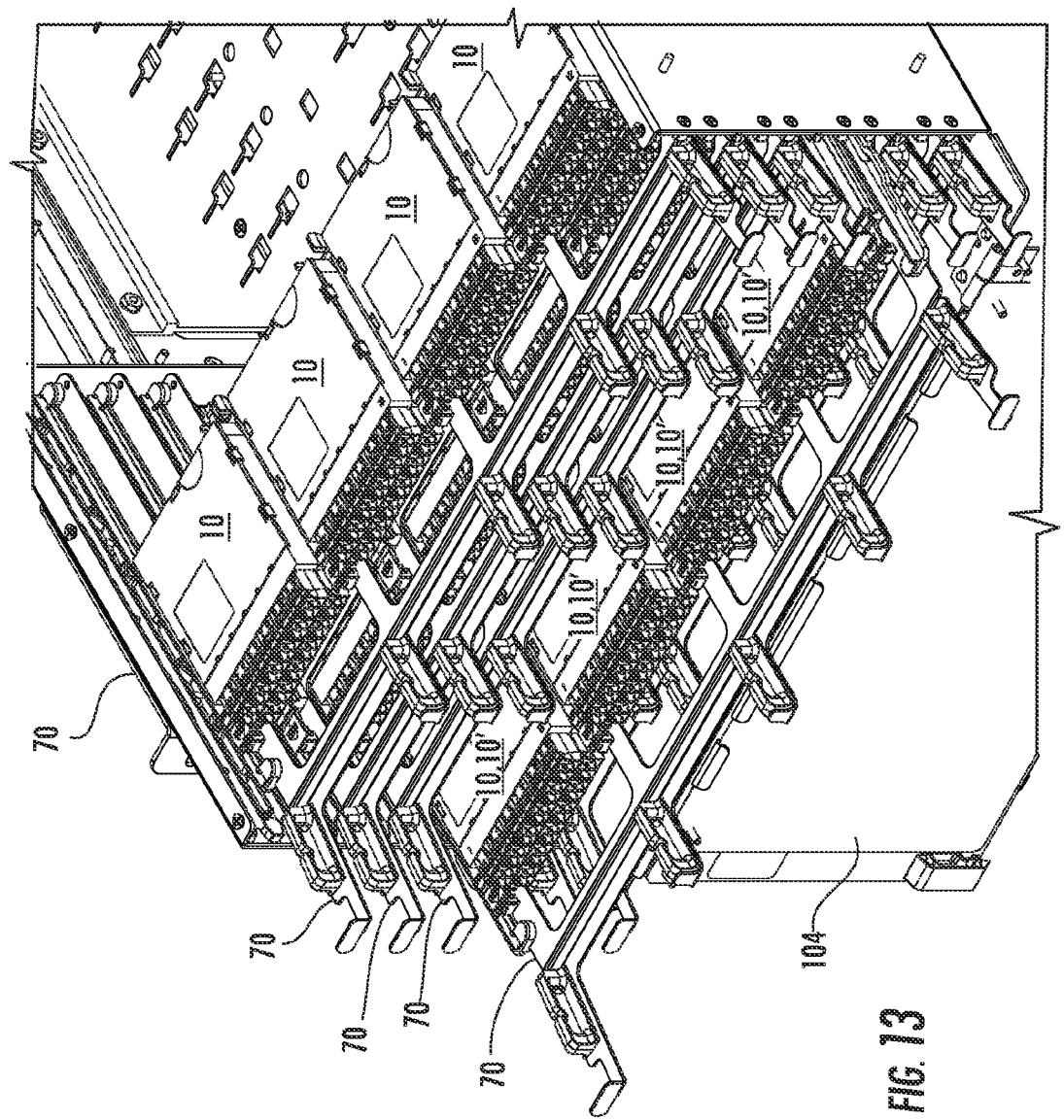
FIG. 13 is a front perspective view of the 4-U size chassis of FIGS. 12A and 12B with a fiber optic equipment tray supporting stacked fiber optic modules pulled out from the fiber optic equipment tray.

Chassis sizes other than 1-U are possible. For example, FIGS. 12A and 12B are front perspective views of an alternate exemplary 4-U size chassis 100 that can support the fiber optic equipment trays 70 of FIGS. 8-10 supporting stacked fiber optic modules 10, 10'. The chassis 100 is a 4-U sized chassis and is configured to hold the fiber optic equipment trays 70 each supporting one or more stacked fiber optic modules 10, 10'. The tray guide rails 88 of the fiber optic equipment trays 70 previously described with regard to FIGS. 8-10 can be inserted into tray rail guides 102 (FIG. 12B) disposed in the chassis 100 to allow each fiber optic equipment tray 70 to be independently extended out from and retracted back into the chassis 100, as illustrated in FIG. 13. A front door 104 is attached to the chassis 100 and is configured to close about the chassis 100 to secure the fiber optic equipment trays 70 disposed in the chassis 100. A cover 108 is also attached to the chassis 100, as illustrated in FIG. 12A, to secure the fiber optic equipment trays 70. FIG. 12B illustrates the chassis 100 with the cover 108 removed.

Up to twelve (12) fiber optic equipment trays 70 can be supported by the chassis 100. However, if the fiber optic equipment trays 70 support stacked fiber optic modules 10, 10', due to the additional space consumed by the stacked fiber optic modules 10, 10', six (6) of such fiber optic equipment trays 70 can be provided in the chassis 100 if all six (6) such fiber optic equipment trays 70 support stacked fiber optic modules 10, 10'. Each fiber optic equipment tray 70 disposed in the chassis 100 that includes at least one stacked fiber optic module 10, 10' reduces the total number of fiber optic equipment trays 70 that can be supported by the chassis 100 by two (2). However, the total count of fiber optic connections that can be supported by the chassis 100 is not reduced in any of these configurations.

Figure 14:
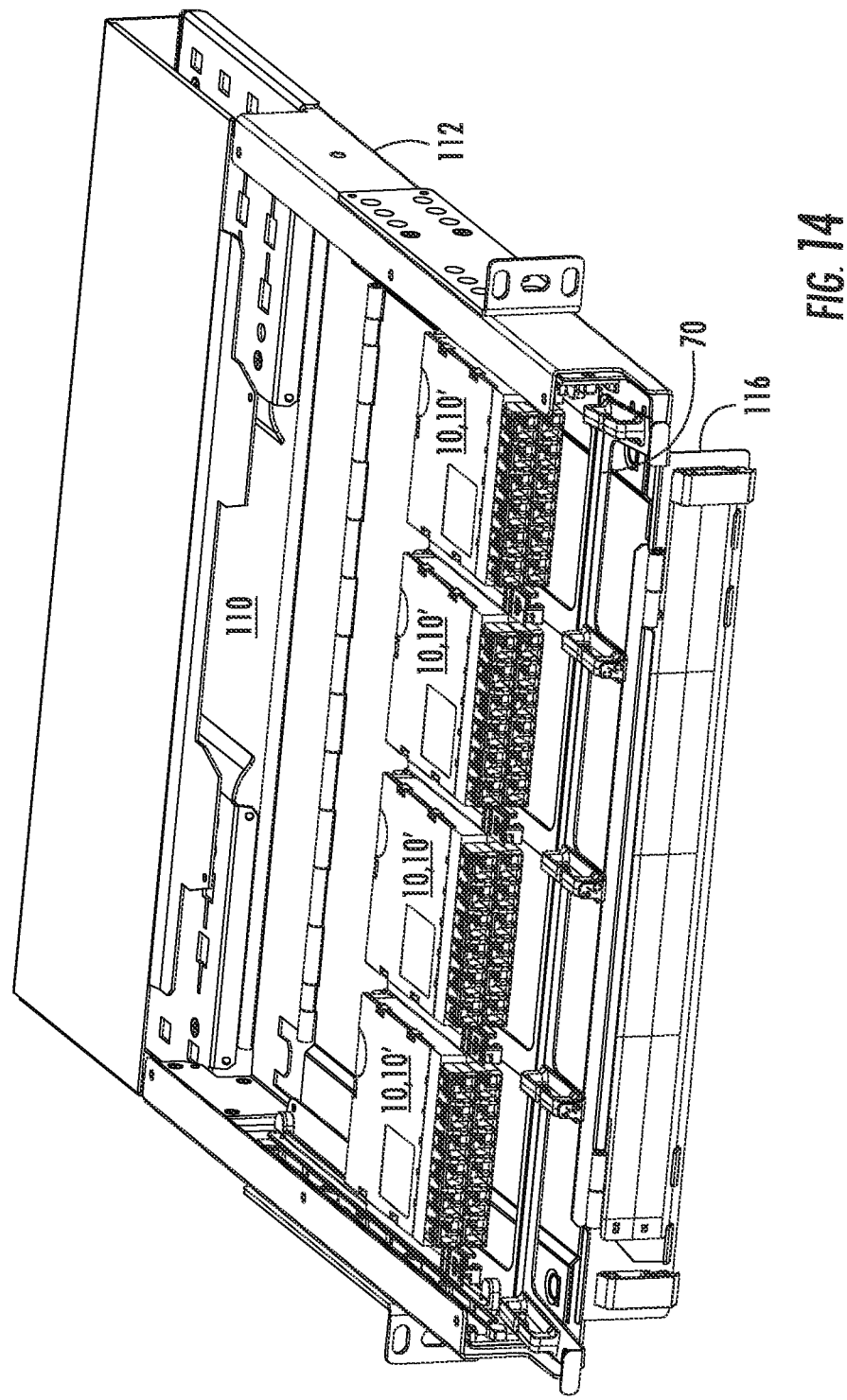
FIG. 14 is a front perspective view of an exemplary fiber optic equipment drawer installed in a chassis and supporting fiber optic equipment trays supporting stacked fiber optic modules, according to another embodiment.
Figure 15:
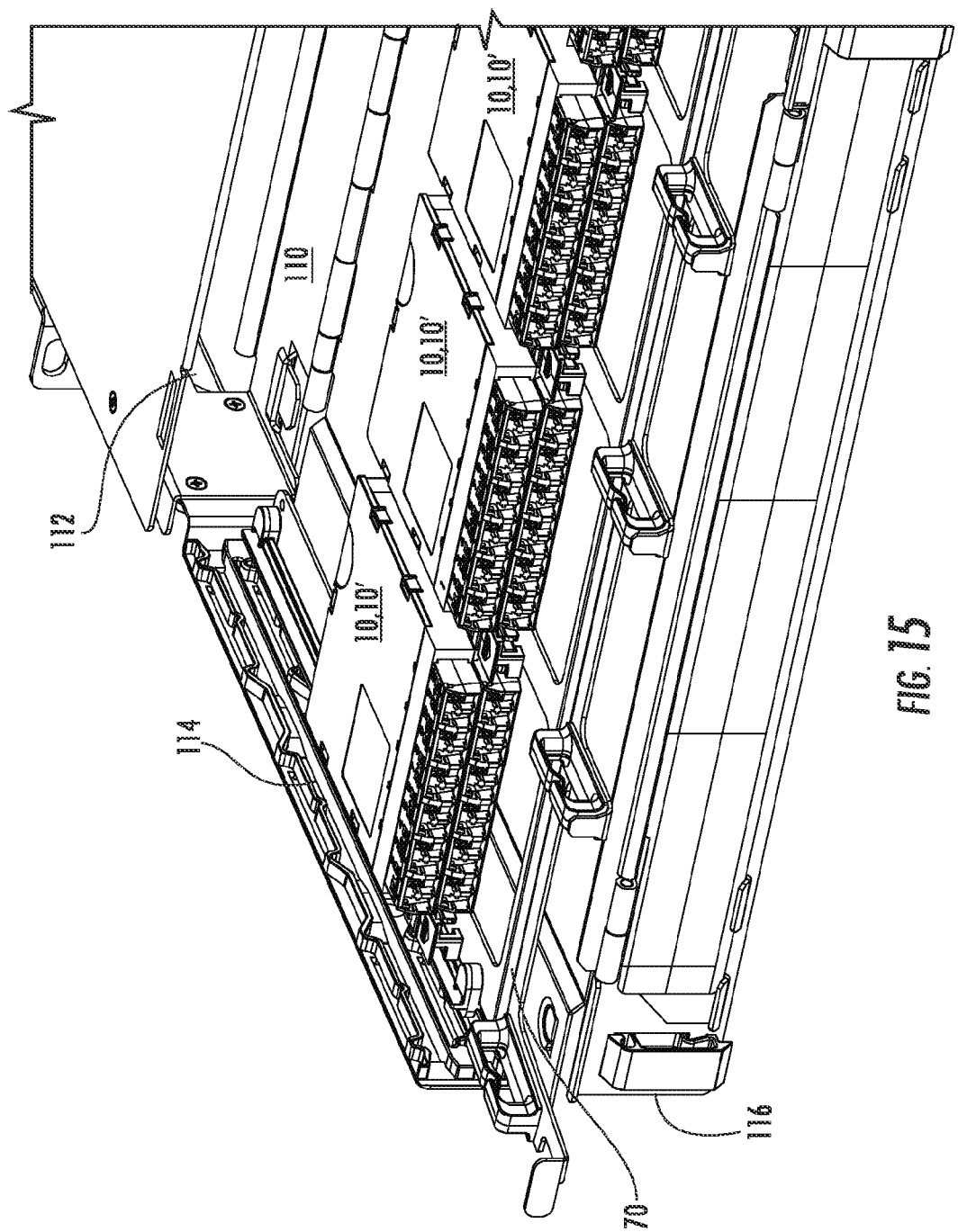
FIG. 15 is a front perspective view of an exemplary fiber optic equipment tray supported by the fiber optic equipment drawer of FIG. 14 and pulled out from the fiber optic equipment drawer.

FIG. 14 illustrates alternate exemplary fiber optic equipment that can support the fiber optic equipment trays 70, which can support the stacked fiber optic modules 10, 10'. In this regard, FIG. 14 illustrates a front perspective view of a fiber optic equipment drawer 110 (also referred to herein as "drawer 110") installed in a chassis 112 and supporting fiber optic equipment trays 70 supporting stacked fiber optic modules 10, 10'. FIG. 15 is a close-up view of FIG. 14.

The chassis 112 includes the drawer 110 supporting one or more extendable fiber optic equipment trays 70. Each fiber optic equipment tray 70 supported by the drawer 110 is independently translatable from the drawer 110, whether or not the drawer 110 is extended out from the chassis 112 or tilted downward, as illustrated in FIG. 16. The fiber optic equipment trays 70 can be moved and extended from the drawer 110 and refracted back into the drawer 110. Any number of fiber optic equipment trays 70 can be provided. Each fiber optic equipment tray 70 supports one or more of the stacked fiber optic modules 10, 10'. The drawer 110 is extendable out from the chassis 112 to allow improved access to the fiber optic equipment trays 70 and the stacked fiber optic modules 10, 10' supported therein.

The chassis 112 is a 1-U sized chassis and is configured to hold the fiber optic equipment trays 70 each supporting one or more stacked fiber optic modules 10, 10'. The tray guide rails 88 of the fiber optic equipment trays 70 previously described with regard to FIGS. 8-10 can be inserted into tray rail guides 114 disposed in the drawer 110, as illustrated in FIGS. 15 and 16, to allow each fiber optic equipment tray 70 to be independently extended out from and retracted back into the drawer 110. A front door 116 is attached to the drawer 110 and is configured to close about the drawer 110 to secure the fiber optic equipment trays 70 and fiber optic modules disposed therein in the drawer 110.

In the example of the drawer 110 in FIG. 14, one (1) fiber optic equipment tray 70 is supported. This is because although the drawer 110 can support up to two (2) fiber optic equipment trays 70, the stacked fiber optic modules 10, 10' consume space needed for a second fiber optic equipment tray 70. If only non-stacked fiber optic modules were supported, two (2) fiber optic equipment trays 70 could be supported in the chassis 112. The number of fiber optic connections supported by the drawer 110, however, is not reduced.

Many modifications and other embodiments of the invention set forth herein will come to mind to one skilled in the art to which the invention pertains having the benefit of the teachings presented in the foregoing descriptions and the associated drawings. These modifications include, but are not limited to, the number and type of fiber optic components provided in the stacked fiber optic module, the configuration and/or alignment of bodies or sub-bodies of the stacked fiber optic module, the number or type of fiber optic equipment, the number and type of fiber optic module, the number and type of fiber optic equipment tray, and features included in the fiber optic equipment tray. Any size equipment, including but not limited to 1-U, 2-U and 4-U sizes, may include some or all of the aforementioned features and fiber optic modules disclosed herein and some or all of their features. Further, the modifications are not limited to the type of fiber optic equipment tray or the means or device to support fiber optic modules installed in the fiber optic equipment trays. The fiber optic modules can include any fiber optic connection type, including but not limited to fiber optic connectors and adapters, and number of fiber optic connections, density, etc.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Therefore, it is to be understood that the embodiments are not to be limited to the specific embodiments disclosed and that modifications and other embodiments are intended to be included within the scope of the appended claims. It is intended that the embodiments cover the modifications and variations of this invention provided they come within the scope of the appended claims and their equivalents. Although specific terms are employed herein, they are used in a generic and descriptive sense only and not for purposes of limitation.

What is claimed is:

1. A stacked fiber optic module, comprising: a body having at least one front side and at least one rear side and defining at least one internal chamber disposed between the at least one front side and the at least one rear side, the body further comprised of a second sub-body engaged on top of a first sub-body to secure the second sub-body to the first sub-body, wherein the second sub-body can translate relative to the first sub-body; a first plurality of fiber optic components disposed in a first longitudinal axis in the at least one front side of the first sub-body; and a second plurality of fiber optic components disposed adjacent the first plurality of fiber optic components in a second longitudinal axis parallel or substantially parallel to the first longitudinal axis in the at least one front side of the second sub-body wherein the first plurality of fiber optic components is comprised of at least twelve (12) fiber optic connections disposed in a width of the first front opening of ninety (90) mm or less; and the second plurality of fiber optic components is comprised of at least (12) fiber optic connections disposed in a width of the second front opening of ninety (90) mm or less.

2. The stacked fiber optic module of claim 1, wherein the front side of the second sub-body can translate a distance of about 10 millimeters beyond the front side of the first sub-body or vice versa.

3. The stacked fiber optic module of claim 1, wherein the first plurality of fiber optic components is configured to be disposed in a different plane as the second plurality of fiber optic components.

4. The stacked fiber optic module of claim 1, wherein the first plurality of fiber optic components are disposed in a first front opening disposed along the first longitudinal axis in the at least one front side of the body.

5. The stacked fiber optic module of claim 4, wherein the second plurality of fiber optic components are disposed in a second front opening disposed along the second longitudinal axis in the at least one front side of the body.

6. The stacked fiber optic module of claim 5, wherein the first front opening is configured to be disposed in a same plane or substantially the same plane as the second front opening.

7. The stacked fiber optic module of claim 1, wherein the first sub-body and the second sub-body are provided as separated bodies.

8. The stacked fiber optic module of claim 1, further comprising at least one locking tab disposed in the second sub-body configured to engage with at least one rail disposed in the first sub-body to secure the second sub-body to the first sub-body.

9. The stacked fiber optic module of claim 8, wherein the at least one locking tab is configured to translate about the at least one rail to allow the second sub-body to translate about the first sub-body.

10. The stacked fiber optic module of claim 1, further comprising at least one rail disposed on either the first sub-body or the second sub-body, and configured to be received within at least one guide member.

11. The stacked fiber optic module of claim 1, further comprising a cover disposed in either the first sub-body or the second sub-body.

12. The stacked fiber optic module of claim 1, further comprising at least one fiber optic component disposed through the at least one rear side of the body optically connected to at least one fiber optic component in at least one of the first plurality of fiber optic components and the second plurality of fiber optic components.

13. The stacked fiber optic module of claim 1, wherein the first plurality of fiber optic components is comprised of a first plurality of fiber optic connectors or a first plurality of fiber optic adapters, and the second plurality of fiber optic components is comprised of a second plurality of fiber optic connectors or a second plurality of fiber optic adapters.

14. The stacked fiber optic module of claim 1, further comprising at least one rail disposed on the body configured to be received within at least one guide member.

15. The stacked fiber optic module of claim 14, further comprising at least one latch attached to the at least one rail and configured to engage the at least one rail.

16. The stacked fiber optic module of claim 1 disposed in fiber optic equipment comprised from the group consisting of a fiber optic chassis and a fiber optic equipment drawer.

17. The stacked fiber optic module of claim 5, wherein:
the first front opening is configured to support a fiber optic connection density of at least one fiber optic connection per 7.0 mm of width of the first front opening; and
the second front opening is configured to support a fiber optic connection density of at least one fiber optic connection per 7.0 mm of width of the second front opening.

18. The stacked fiber optic module of claim 1, further comprising at least one plurality of optical fibers disposed in the at least one internal chamber;
the at least one plurality of optical fibers optically connected to at least one of the first plurality of fiber optic components and the second plurality of fiber optic components.

19. The stacked fiber optic module of claim 18, wherein the at least one plurality of optical fibers are provided in at least one fiber optic harness disposed in the at least one internal chamber.

\* \* \* \* \*